US012603878B2

(12) United States Patent
Kwon et al.

(10) Patent No.: US 12,603,878 B2
(45) Date of Patent: Apr. 14, 2026

(54) ELECTRONIC DEVICE AND METHOD FOR CONTROLLING VEHICLE BASED ON DRIVER AUTHENTICATION

(71) Applicant: SAMSUNG ELECTRONICS CO., LTD., Suwon-si (KR)

(72) Inventors: Eunyoung Kwon, Suwon-si (KR); Daehaeng Cho, Suwon-si (KR); Gawon Lee, Suwon-si (KR); Seonhee Lee, Suwon-si (KR); Jisoo Lee, Suwon-si (KR); Taeckki Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/960,013

(22) Filed: Oct. 4, 2022

(65) Prior Publication Data

US 2023/0147516 A1     May 11, 2023

Related U.S. Application Data

(63) Continuation of application No. PCT/KR2022/014032, filed on Sep. 20, 2022.

(30) Foreign Application Priority Data

Nov. 10, 2021     (KR) ........................ 10-2021-0153855

(51) Int. Cl.
*H04L 9/40*          (2022.01)
(52) U.S. Cl.
CPC ........ *H04L 63/083* (2013.01); *H04L 63/0853* (2013.01)
(58) Field of Classification Search
CPC ........................... H04L 63/083; H04L 63/0853
See application file for complete search history.

(56) References Cited

U.S. PATENT DOCUMENTS 7,868,736 B2    1/2011  Fukushima et al.
9,988,016 B1 *  6/2018  Bianchi, III .......... H04W 12/06
(Continued)

FOREIGN PATENT DOCUMENTS

KR    10-2019-0104401       9/2019
KR    10-2020-0138059      12/2020

OTHER PUBLICATIONS

Search Report and Written Opinion dated Dec. 27, 2022 issued in International Patent Application No. PCT/KR2022/014032.

*Primary Examiner* — Rupal Dharia
*Assistant Examiner* — Raghavender Cholleti
(74) *Attorney, Agent, or Firm* — Nixon & Vanderhye, P.C.

(57)          ABSTRACT

Various embodiments of the disclosure disclose a method and an apparatus comprising: a communication module comprising communication circuitry, a memory, and a processor operatively connected to at least one of the communication module and the memory, wherein the processor is configured to: based on the electronic device being connected to a vehicle, transmit mobile identity document information stored in the memory to the vehicle through the communication module, receive vehicle information from the vehicle based on the mobile identity document information being completely authenticated by the vehicle, generate a digital key of the vehicle based on the vehicle information or the mobile identity document information, transmit the generated digital key to the vehicle, receive a digital key signed by the vehicle and driver identification information from the vehicle, and store the signed digital key and the driver identification information in the memory.

9 Claims, 17 Drawing Sheets

(56)                  References Cited

U.S. PATENT DOCUMENTS

| | | | |
|---|---|---|---|
| 10,589,719 | B1 | 3/2020 | Sohn et al. |
| 10,728,222 | B2 * | 7/2020 | Kimn ................ H04W 12/0431 |
| 11,153,077 | B2 * | 10/2021 | Dreasher ................ B61L 27/40 |
| 2004/0054934 | A1 * | 3/2004 | Emmerling ............ B60R 25/24 |
| | | | 713/168 |
| 2007/0001805 | A1 * | 1/2007 | Utter ...................... B60R 25/24 |
| | | | 340/5.72 |
| 2008/0299954 | A1 | 12/2008 | Wright et al. |
| 2015/0149042 | A1 * | 5/2015 | Cooper ................ B60R 25/245 |
| | | | 701/48 |
| 2017/0104589 | A1 * | 4/2017 | Lambert .............. H04L 9/3268 |
| 2018/0326947 | A1 * | 11/2018 | Oesterling ............ B60R 25/241 |
| 2019/0159026 | A1 * | 5/2019 | Rezaei ................ H04L 63/0853 |
| 2019/0378220 | A1 * | 12/2019 | Ibrahim .................... H04L 9/50 |
| 2020/0052905 | A1 | 2/2020 | Mathias et al. |
| 2020/0265418 | A1 * | 8/2020 | Lee .................. G06Q 20/40145 |
| 2020/0275274 | A1 * | 8/2020 | Kwon ................ H04L 63/0861 |
| 2020/0361335 | A1 * | 11/2020 | Penilla .................. B60R 25/241 |
| 2021/0037099 | A1 | 2/2021 | Diaz et al. |
| 2021/0107380 | A1 * | 4/2021 | Jo ........................ B60N 2/0023 |
| 2021/0168602 | A1 | 6/2021 | Kim et al. |
| 2022/0188095 | A1 * | 6/2022 | Chen ...................... G07C 5/008 |

* cited by examiner

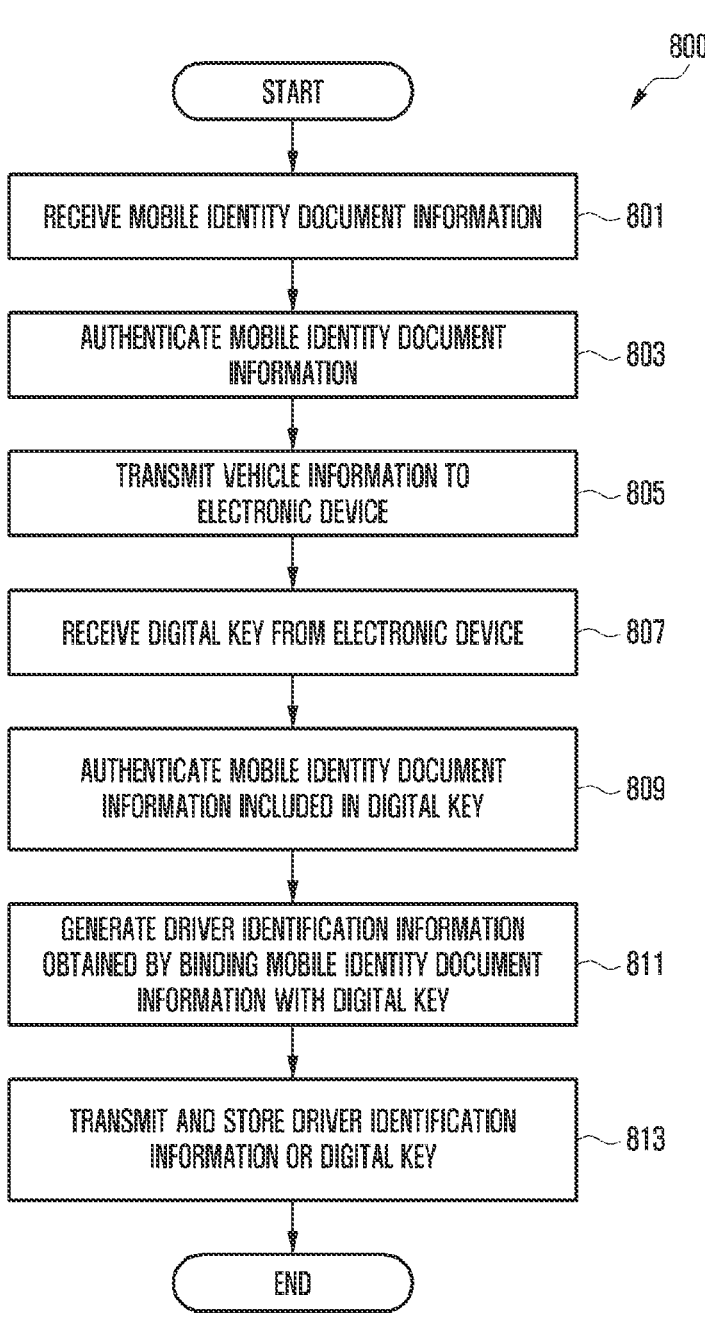

800

START

RECEIVE MOBILE IDENTITY DOCUMENT INFORMATION ~ 801

AUTHENTICATE MOBILE IDENTITY DOCUMENT INFORMATION ~ 803

TRANSMIT VEHICLE INFORMATION TO ELECTRONIC DEVICE ~ 805

RECEIVE DIGITAL KEY FROM ELECTRONIC DEVICE ~ 807

AUTHENTICATE MOBILE IDENTITY DOCUMENT INFORMATION INCLUDED IN DIGITAL KEY ~ 809

GENERATE DRIVER IDENTIFICATION INFORMATION OBTAINED BY BINDING MOBILE IDENTITY DOCUMENT INFORMATION WITH DIGITAL KEY ~ 811

TRANSMIT AND STORE DRIVER IDENTIFICATION INFORMATION OR DIGITAL KEY ~ 813

END

1

ELECTRONIC DEVICE AND METHOD FOR CONTROLLING VEHICLE BASED ON DRIVER AUTHENTICATION

CROSS-REFERENCE TO RELATED APPLICATIONS

This application is a continuation of International Application No. PCT/KR2022/014032 designating the United States, filed on Sep. 20, 2022, in the Korean Intellectual Property Receiving Office and claiming priority to Korean Patent Application No. 10-2021-0153855, filed on Nov. 10, 2021, in the Korean Intellectual Property Office, the disclosures of which are incorporated by reference herein in their entireties.

BACKGROUND

Field

The disclosure relates to a method and an electronic device for controlling vehicle on the basis of driver authentication.

Description of Related Art

With the development of digital technologies, various types of electronic devices such as mobile communication terminals, personal digital assistants (PDAs), electronic organizers, smart phones, tablet personal computers (PCs), and wearable devices have become widely used. A hardware part and/or a software part of the electronic device is continuously developed to support and increase functions.

Meanwhile, a relevant technology (for example, block-chain technology), a system, and/or standard (for example, ISO 18013-5) for allowing a mobile identity document that can replace a physical identity document (for example, a plastic identity document) to be used through an electronic device are being discussed. The identity document may represent a certificate that is managed by a national organization and can authenticate a user (for example, prove a person's identity) such as an identity card (identity document), a driver's license, and/or a password.

For example, the identity document for proving identity information exists in the form of a plastic card and may be required to be always carried. Recently, according to various physical cards for payment services using electronic devices with mobile cards, requirements for inserting the identity document capable of proving the user's identity into the electronic device to use the identity document have increased. According to an embodiment, the user may store a driver's license of the user in the electronic device and show a mobile driver's license through the electronic device as necessary even though the user does not carry the current plastic driver's license.

A vehicle has been developed not only to improve the performance as a means of transportation but also to improve various functions related to safe driving of the driver. For example, an advanced driver assistance system (ADAS) or an autonomous vehicle is actively being developed. For example, the vehicle may acquire various pieces of information from the outside through a wireless communication module, support safe driving of the driver by processing the acquired information, and provide information for allowing autonomous driving.

SUMMARY

Embodiments of the disclosure provide a method and an apparatus for matching driver identification information with a digital key stored in an electronic device instead of a physical key of a vehicle to authenticate the driver identification information when the vehicle is controlled and allow only an authenticated driver to control the vehicle (for example, open the door, start the vehicle, or perform autonomous driving).

An electronic device according to various example embodiments of the disclosure includes: a communication module comprising communication circuitry, a memory, and a processor operatively connected to at least one of the communication module and the memory, wherein the processor is configured to: based on the electronic device being connected to a vehicle, transmit mobile identity document information stored in the memory to the vehicle through the communication module, receive vehicle information from the vehicle, generate a digital key of the vehicle based on the vehicle information and/or the mobile identity document information, transmit the generated digital key to the vehicle, receive a digital key signed by the vehicle and driver identification information from the vehicle, and store the signed digital key and the driver identification information in the memory.

An electronic device included in a vehicle according to various example embodiments of the disclosure includes: a communication module comprising communication circuitry, a memory, and a processor operatively connected to at least one of the communication module and the memory, wherein the processor is configured to: based on the electronic device being connected to a first external device, receive first mobile identity document information from the first external device through the communication module, authenticate the first mobile identity document information and transmit vehicle information of the vehicle stored in the memory to the first external device, receive a first digital key from the first external device and authenticate the first digital key, sign the first digital key based on the authentication of the first digital key, generate first driver identification information corresponding to the first mobile identity document information, and transmit the signed first digital key and the first driver identification information to the first external device.

A method of operating an electronic device according to various example embodiments of the disclosure includes: based on the electronic device being connected to a vehicle through a communication module, transmitting mobile identity document information stored in a memory of the electronic device to the vehicle, receiving vehicle information from the vehicle, generating a digital key of the vehicle based on the vehicle information or the mobile identity document information, transmitting the generated digital key to the vehicle, receiving a digital key signed by the vehicle and driver identification information from the vehicle, and storing the signed digital key and the driver identification information in the memory.

According to various example embodiments, it is possible to enforce driver authentication, security, and safety required for controlling an autonomous driving car and combine user identification information with a biometric authentication-based digital key, so as to enhance personal identification and provide functions using the same and various application services.

According to various example embodiments, it is possible to enhance user authentication and safety by allowing the control of the vehicle when validity of driver's license information is also identified compared to authentication of the digital key of the vehicle based on possession.

According to various example embodiments, it is possible to automatically transfer a data log stored in the vehicle to the electronic device when an accident occurs during autonomous driving and transfer a data log signed by the digital key to an insurance account associated with the user on the basis of settings of the electronic device or identification of the user, so as to make good use of the data log for technical base data of analyzing cause of the accident and processing the accident.

According to various example embodiments, it is possible to provide a guide from the current location of the electronic device to the vehicle through the remote control of the digital key using short-range wireless communication (for example, UWB or BLE) and automatically calculate charges (parking fee, toll, or the like) in connection with a user's account.

According to various example embodiments, it is possible to configure departure and destination through a navigation application and issue the digital key of the vehicle to an electronic device of another user (for example, a friend or a designated driver), so as to selectively allow autonomous driving only when the digital key of another user and driver information are identified.

According to various example embodiments, it is possible to identify validity of a driver's license of the user through an application of a shared vehicle or a car rental service and, when the driver's license is valid, issue the driver's license of the user and the digital key to an electronic device of the user.

According to various example embodiments, when the driver's license of the driver and the digital key all match, it is possible to allow the driver to control the shared vehicle or the rented car (for example, open the door, start the vehicle, perform remote control, or perform autonomous driving).

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 3A, 3B and 3C are diagrams illustrating an example in which the electronic device stores a digital key of the vehicle according to various embodiments;

FIG. 8 is a flowchart illustrating an example method by which the vehicle issues a digital key linked with a mobile identity document according to various embodiments;

DETAILED DESCRIPTION

Figure 1:
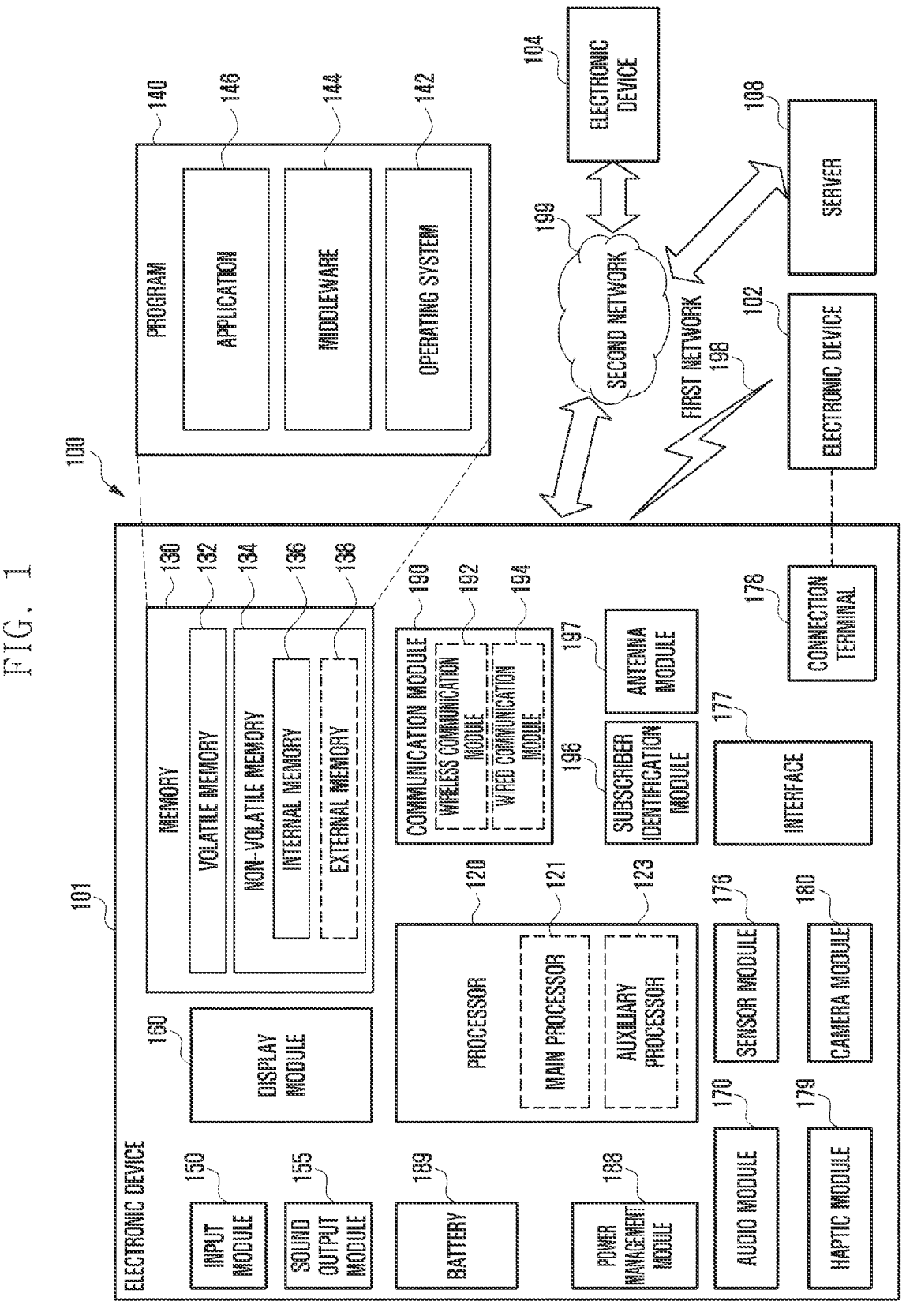
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
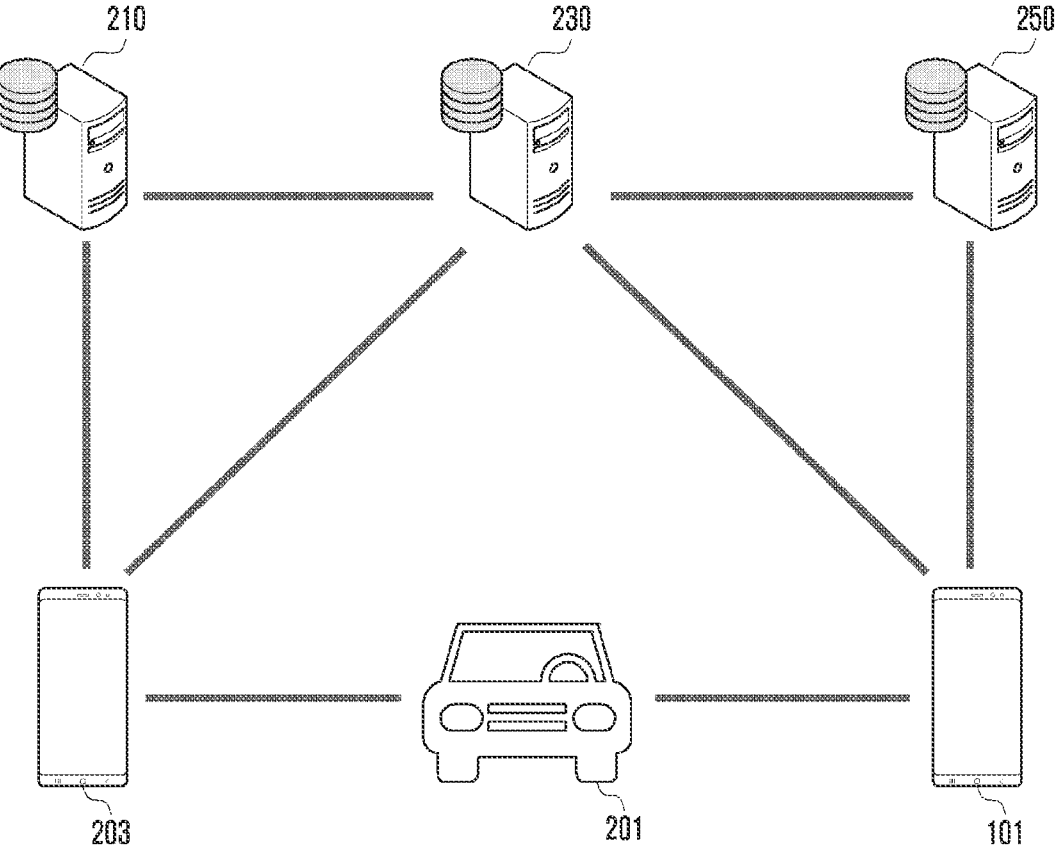
FIGS. 2A and 2B are diagrams illustrating example digital key structures of a vehicle stored in the electronic device according to various embodiments.

FIG. 2A is a diagram illustrating an example network environment in which an electronic device issues and shares a digital key of a vehicle according to various embodiments.

Referring to FIG. 2A, a digital key system may include at least one of a vehicle 201, a vehicle server 230 (for example, the server 108 of FIG. 1), a first electronic device (for example, the electronic device 101 of FIG. 1 and, hereinafter, referred to as the 'first electronic device 101'), a first electronic device server 250, a second electronic device 203 (for example, the electronic device 102 of FIG. 1), and a second electronic device server 210. The first electronic device 101 may be an electronic device of an owner (hereinafter, referred to as a 'user' or a 'first user') possessing a vehicle car of the vehicle 201. The second electronic device 203 may be an electronic device of another user (hereinafter, referred to as a 'second user') sharing the vehicle key of the vehicle 201 with the first electronic device 101.

The vehicle server 230 may issue a certificate required for issuing a digital key to the vehicle 201. The vehicle server 230 may be connected to the first electronic device server 250 or the second electronic device server 210. When the first electronic device 101 shares the digital key with the second electronic device 203, the vehicle server 230 may relay communication between the first electronic device server 250 and the second electronic device server 210. The vehicle server 230 may provide key sharing information (for example, information on a second digital key issued to the second electronic device 230) to the vehicle 201 and manage information on the control of the vehicle 201 through a database.

The first electronic device 250 may issue a certificate required for issuing a digital key to the first electronic device 101. The first electronic device server 250 may be connected to the vehicle server 230. When the first electronic device 101 shares a vehicle key with the second electronic device

203, the first electronic device server 250 may link with the vehicle server 230 and remotely perform a key sharing operation.

The second electronic device server 210 may issue a certificate required for issuing a digital key to the second electronic device 203. The second electronic device server 210 may be connected to the vehicle server 230. When the first electronic device 101 shares a vehicle key with the second electronic device 203, the second electronic device server 210 may link with the vehicle server 230 and remotely perform a key sharing operation.

Hereinafter, a digital key issuing operation is described in greater detail.

The owner of the vehicle 201 may possess a vehicle key (for example, a physical vehicle key) of the vehicle 201, get in the vehicle 201, and make a request for issuing a digital key. The vehicle 201 may recognize the physical vehicle key (for example, a smart key) corresponding to the vehicle 201 through a communication module (for example, the communication module 530 of FIG. 5) or a sensor module (for example, the sensor module 590 of FIG. 5). The physical vehicle key may be recognized and the vehicle 201 may receive a request for issuing the digital key through at least one of a menu displayed through a display (for example, the display 510 of FIG. 5), a configured button, or configured voice recognition. A processor for issuing the digital key may, for example, follow the specification defined by car connectivity consortium (CCC) as owner pairing. Hereinafter, information exchange (for example, transmission or reception) between the vehicle 201 and the first electronic device 101 may be performed by an encrypted protocol.

By way of non-limiting example, the vehicle 201 may establish encrypted communication with the first electronic device 101 and make a request for a mobile identity document to the first electronic device 101 in response to the digital key issuing request. The mobile identity document is related to a first user of the first electronic device 101, and thus may be referred to as a first mobile identity document. The vehicle 201 may receive (or acquire) the first mobile identity document from the first electronic device 101 by the request.

The first mobile identity document (or mobile identity document information) according to various embodiments may include mobile identity document signature information (for example, an issuer signed item) and mobile security object (MSO) information. The mobile identity document signature information may include at least one of a digest ID, a random value, an information identifier (element identifier) of a mobile identity document, or an information value (element value) of a mobile identity document. The digest ID may be an identifier for authenticating the mobile identity document from an issuing authority (for example, the server 401 of FIG. 4). The random value may be a value for encrypting an information identifier of the mobile identity document. The information identifier of the mobile identity document may include at least one of a name, a date of birth, an issue date, an expiration date (or an expiry date), an issuing authority, an identity document identification number (for example, a resident registration number, a driver number, or the like), or a photo (for example, a face photo) corresponding to the first user. The information value of the mobile identity document may include a value for an identifier of the mobile identity document.

The MSO information may include a value obtained by hashing a value included in mobile identity document signature information. The MSO information may be signed by a private key of the issuing authority (for example, the server

Figure 4:
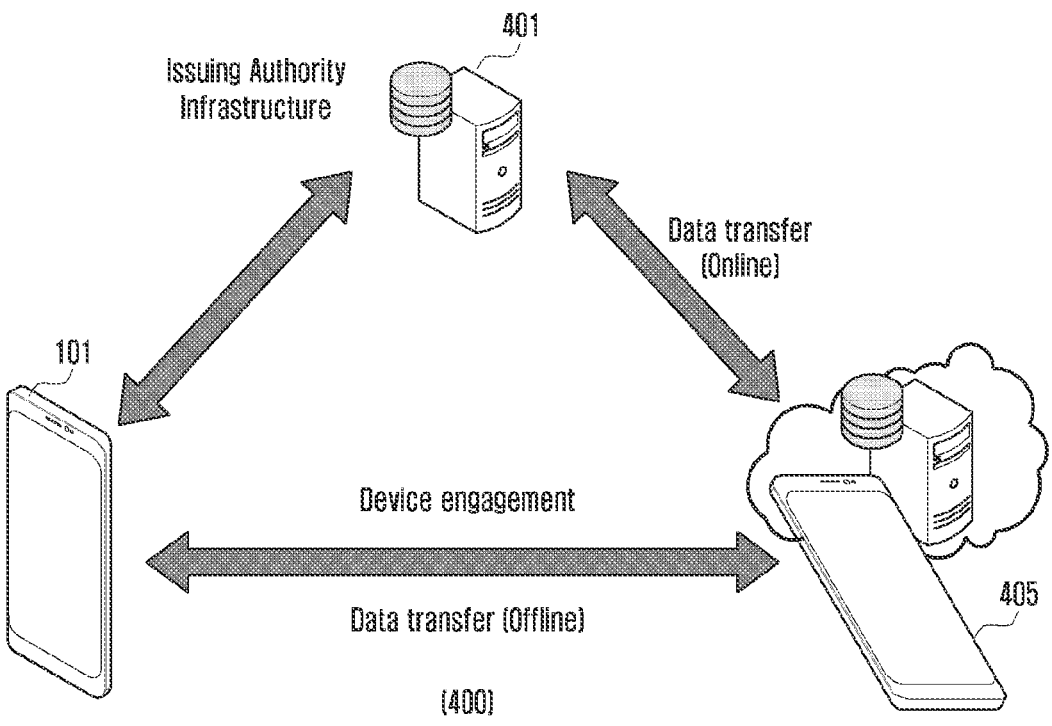
FIG. 4 is a diagram illustrating an example mobile identity document service system according to various embodiments.

401 of FIG. 4) and issued. The MSO information may include at least one of an MSO version, a hash algorithm version, a digest value, device information, a doctype, or validity information. The hash algorithm version may be a version of hashing the mobile identity document signature information. The hash algorithm version may be one of SHA256, SHA384, and SHA512 algorithms The device information may be information on an electronic device storing the mobile identity document signature information. The digest value may be a value obtained by hashing the mobile identity document signature information. The digest value may be a value obtained by hashing each of a digest ID, a random value, an information identifier of a mobile identity document, or an information value of a mobile identity document in the hash algorithm version.

The vehicle 201 may authenticate the acquired first mobile identity document information (mobile driver's license (mDL)) and, when the authentication is completed, transmit vehicle information to the first electronic device 101. Authentication of the mobile identity document may be performed according to the standard specification (for example, ISO 18013-5) defined in the ISO. Authentication of the mobile identity document may be performed in a device-based mode (for example, a device data retrieval mode) or a server-based mode (for example, a server data retrieval mode), and when the digital key is issued in the first electronic device 101, may be performed in the device-based mode to use the mobile identity document. Authentication of the mobile identity document is described in greater detail below with reference to FIG. 4.

According to various embodiments, the vehicle 201 may further receive device information of the first electronic device 101. The device information of the first electronic device 101 may include at least one of a phone number of the first electronic device 101, a serial number, a model name, or a type. The vehicle 201 may authenticate device information of the first electronic device 101 in addition to the authentication of the mobile identity document, and when the device information of the mobile identity document is completely authenticated, transmit vehicle information to the first electronic device 101.

Since the digital key replacing the physical vehicle key should include vehicle information, the vehicle 201 may transmit the vehicle information. The vehicle information may include at least one of a vehicle name, a vehicle type, a vehicle serial number (or a vehicle identification number), a vehicle release data (or a production date), or a vehicle production country. When transmitting the vehicle information, the vehicle 201 may insert the first mobile identity document information into the vehicle information and transmit the vehicle information. The first mobile identity document information may be the same as information included in the first mobile identity document or may include only some information included in the first mobile identity document. For example, the first mobile identity document information may include a digest ID or a digest of a first identity document identification number (or a name corresponding to the first user) included in the first mobile identity document. The vehicle information or data (items) included in the first mobile identity document information are listed only to help understanding of the disclosure and the number thereof may be larger or smaller than described. For example, the vehicle 201 may insert the first mobile identity document information into configuration information of the vehicle information (for example, endpoint configuration data) and transmit the configuration information to the first electronic device 101.

The first electronic device 101 may receive vehicle information including the first mobile identity document information from the vehicle 201. The first electronic device 101 may determine whether the first mobile identity document information included in the received vehicle information corresponds to first mobile identity document information (for example, mobile identity document information transmitted to the vehicle 201) stored in a memory (for example, the memory 130 of FIG. 1) and, when they are the same as each other, generate a digital key (for example, a pair of encryption keys). The digital key is issued in the first electronic device 101 and thus may be referred to a 'first digital key'. For example, the first electronic device 101 may identify whether the digest ID or the digest of the identity document identification number of the first mobile identity document information included in the vehicle information is the same as MSO information stored in the memory 130. The MSO information is a value obtained by hashing mobile identity document information (for example, mobile identity document signature information), and thus the first electronic device 101 may hash the digest ID or the digest of the identity document identification number and determine whether the digest value or the digest is the same as the digest value of MSO.

When the first mobile identity document information included in the vehicle information is successfully authenticated, the first electronic device 101 may generate the first digital key on the basis of the vehicle information or the first mobile identity document information. The first electronic device 101 may generate the first digital key using the certificate issued by the first electronic device server 250. The first digital key may include the vehicle information or the first mobile identity document information.

According to various embodiments, the first electronic device 101 may generate the first digital key by further using device information of the first electronic device 101 (for example, a phone number, a serial number, a model name, or a type of the first electronic device 101). In this case, the first digital key may include not only the vehicle information or the first mobile identity document but also device information of the first electronic device 101. Since the first digital key cannot be moved to another device, the user may newly issue the digital key when the user replaces the electronic device (for example, with a new electronic device). When the first mobile identity document information included in the vehicle information is not the same as the first mobile identity document information stored in the memory 130, the first electronic device 101 may not generate a digital key, make a request for the vehicle information again, or download the mobile identity document information again from the issuing authority. The first electronic device 101 may transmit the generated digital key to the vehicle 201.

The vehicle 201 may receive a first digital key, determine whether first mobile identity document information included in the first digital key corresponds to first mobile identity document information included in the vehicle information, and when they are the same as each other, sign the first digital key by a private key of the vehicle 201. The vehicle 201 may store a vehicle key including a private key and a public key of the vehicle in the memory of the vehicle 201. Further, the vehicle 201 may sign the first mobile identity document information by the private key of the vehicle 201 to generate driver identification information. The driver identification information corresponds to the first electronic device 101 and thus may be referred to as 'first driver identification information'. The generated first driver identification information may include the first mobile identity document information or may correspond to the first mobile identity document information. The vehicle 201 may bind (or match) the signed first digital key with the first driver identification information and store them in the memory (for example, the memory 570 of FIG. 5).

When a request (or attempt) for controlling the vehicle 201 (for example, opening the door, staring the vehicle, or performing autonomous driving) is made by the first electronic device 101, the vehicle 201 may authenticate the first digital key or the first driver identification information and allow or not allow the control of the vehicle 201 by the first electronic device 101. The vehicle 201 may transmit the first digital key signed by the private key of the vehicle 201 or the generated first driver identification information to the first electronic device 101.

The first electronic device 101 may receive the first digital key signed by the private key of the vehicle 201 or the first driver identification information from the vehicle 201. The first electronic device 101 may bind (or match) the signed first digital key with the first driver identification information and store them in the memory (for example, the memory 130 of FIG. 1). For example, the first electronic device 101 may store the signed first digital key or the first driver identification information in a private mailbox of a digital key applet. The first digital key received from the vehicle 201 may be signed by the private key of the vehicle 201, and thus may be different from the first digital key transmitted to the vehicle 201.

Hereinafter, the digital key sharing operation is described in greater detail.

When a request for sharing the digital key is made by the second electronic device 203, the first electronic device 101 may authenticate mobile identity document information of the second electronic device 203. In digital key sharing, the first electronic device 101 may be an electronic device (or a system) of a car rental company or an electronic device of the user, and the second electronic device 203 may be an electronic device of a second user (for example, a consumer, a family, an acquaintance, or the like) who rents the vehicle from the car rental company or the user. The mobile identity document information of the second electronic device 203 corresponds to the second electronic device 203, and thus may be referred to as a 'second mobile identity document information'. The first electronic device 101 may receive second mobile identity document information from the second electronic device 203.

The first electronic device 101 may authenticate the second mobile identity document information and, when the second mobile identity document information is completely authenticated, may transmit vehicle information of the vehicle 201 to the second electronic device 203. Since authentication of the second mobile identity document information is the same as authentication of the first mobile identity document information, a detailed description may be omitted. The first digital key stored in the memory 130 of the first electronic device 101 is generated on the basis of the vehicle information of the vehicle 201, and thus the first electronic device 101 may identify (or acquire) the vehicle information of the vehicle 201 from the first digital key. When a request for sharing the digital key is made by the second electronic device 203, the first electronic device 101 may transmit the vehicle information of the vehicle 201 instead of the vehicle 201. Alternatively, the vehicle server 230 may transmit the vehicle information to the second electronic device 203 by the request from the first electronic device 101. According to various embodiments, the first electronic device 101 may or may not insert the second mobile identity document information into the vehicle information and transmit the vehicle information.

The second electronic device 203 may receive the vehicle information and generate a digital key on the basis of the vehicle information. The digital key corresponds to the second electronic device 203, and thus may be referred to as a 'second digital key' hereinafter. The second electronic device 203 may generate the second digital key on the basis of a certificate issued by the second electronic device server 210. According to various embodiments, the second electronic device 203 may generate the second digital key on the basis of the vehicle information and the second mobile identity document information. The second digital key may include the vehicle information and the second mobile identity document information.

According to various embodiments, the second electronic device 203 may determine whether the second mobile identity document information included in the vehicle information corresponds to the second mobile identity document information stored in the memory and, when they are the same as each other, generate the second digital key on the basis of the vehicle information. The second electronic device 203 may transmit the generated second digital key to the first electronic device 101.

According to various embodiments, the second electronic device 203 may generate the second digital key by further using device information of the second electronic device 203 (for example, a phone number, a serial number, a model name, or a type of the second electronic device 203). In this case, the second digital key may include not only the vehicle information or the second mobile identity document but also device information of the second electronic device 203.

The first electronic device 101 may receive the second digital key from the second electronic device 203 and generate second driver identification information obtained by signing the received second digital key by the first digital key. The first digital key may be the digital key of the first electronic device 101. The second driver identification information may include the second mobile identity document information of the second electronic device 203. The first electronic device 101 may bind the signed second digital key with the second driver identification information (for example, a digest ID or digest corresponding to a driver identification information in arbitrary_data of an authorized endpoint attestation data field) and store the same in the memory. The first electronic device 101 may sign the second digital key by the first digital key stored in the memory. The first electronic device 101 may transmit the signed second digital key or the second driver identification information to the second electronic device 203.

According to various embodiments, the signed second digital key or the second driver identification information may be transferred to the vehicle 201 through the vehicle server 230. The vehicle 201 may store the signed second digital key or the second driver identification information. When a request (or attempt) for controlling the vehicle 201 (for example, opening the door, staring the vehicle, or performing autonomous driving) is made by the second electronic device 203, the vehicle 201 may authenticate the second digital key or the second driver identification information and allow or not allow the control of the vehicle 201 by the second electronic device 203.

The first electronic device 101 may identify vehicle information included in the second digital key. The second digital key includes the vehicle information, and thus may identify whether the vehicle information is vehicle information transmitted by the first electronic device 101. When the vehicle information included in the second digital key corresponds to the vehicle information transmitted by the first electronic device 101, the first electronic device 101 may sign the received second digital key by the first digital key. The first electronic device 101 may transmit the signed second digital key or the second driver identification information to the second electronic device 203.

The second electronic device 203 may receive the signed second digital key or the second driver identification information from the first electronic device 101 and store the same in the memory. The second electronic device 203 may store the signed second digital key or the second driver identification information in the private mailbox of the digital key applet. The second digital key received from the first electronic device 101 is signed by the first digital key of the first electronic device 101, and thus may be different from the second digital key transmitted to the first electronic device 101.

Figure 2B:
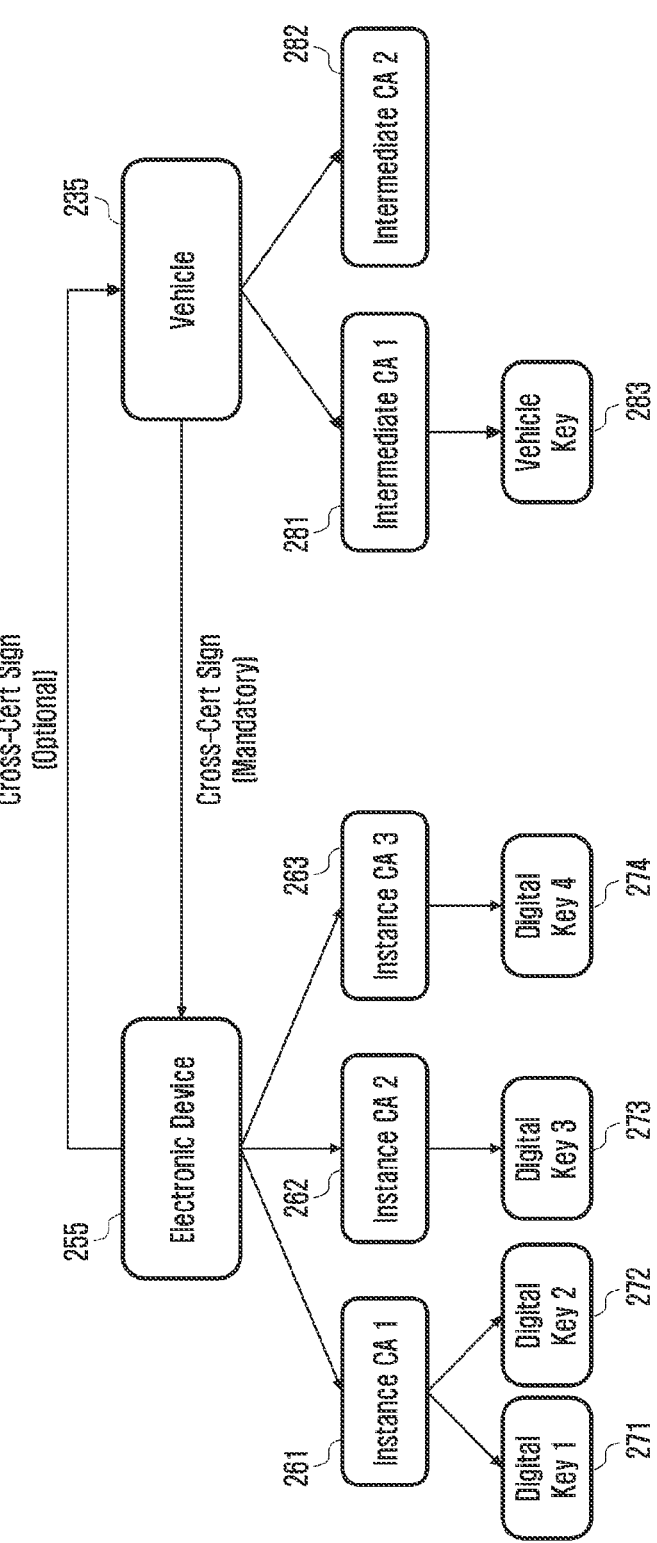

FIG. 2B is a diagram illustrating an example certificate chain structure of a digital key of a vehicle according to various embodiments.

Referring to FIG. 2B, the first electronic device server 250 (or the second electronic device server 210) may include and operate an electronic device certificate authority (CA) 255. The vehicle server 230 may include and operate the vehicle CA 235. The CA may serve to guarantee a server which the first electronic device 101 (or the second electronic device 230) or the vehicle 201 accesses. The electronic device CA 255 and the vehicle CA 235 may perform cross cert on the respective CAs in order to verify a certificate chain between a manufacturer of the electronic device and a vehicle company.

The electronic device CA 255 may issue an instance CA for each vehicle to the first electronic device 101 (or the second electronic device 203). The first electronic device 101 may issue a digital key through owner pairing with the vehicle 201. In owner pairing, the electronic device and the vehicle may exchange the instance CA of the electronic device and the CA of the vehicle. The owner pairing may follow the specification defined in the CCC. For example, the electronic device CA 255 may issue a first instance CA (instance CA 1) 261 in accordance with a first vehicle company, a second instance CA (instance CA 2) 262 in accordance with a second vehicle company, and a third instance CA (CA 3) 263 in accordance with a third vehicle company.

For example, when the user of the first electronic device 101 possesses a vehicle of the first vehicle company, the first electronic device 101 may be issued the first instance CA 261 and generate a first digital key (digital key 1) 271 or a second digital key (digital key 2) 272 on the basis of the first instance CA 261. Alternatively, when the user of the first electronic device 101 possesses a vehicle of the second vehicle company, the first electronic device 101 may be issued the second instance CA 262 and generate a third digital key (digital key 3) 273 on the basis of the second instance CA 262. When the user of the first electronic device 101 possesses a vehicle of the third vehicle company, the first electronic device 101 may be issued the third instance CA 263 and generate a fourth digital key (digital key 4) 274 on the basis of the third instance CA 263.

The vehicle CA 235 may issue the CA (for example, intermediate CA) for each country according to a policy of the vehicle manufacturer and issue a certificate for a vehicle key to each vehicle. For example, the vehicle CA 235 may issue intermediate CA 1 281 and intermediate CA 2 282 and issue the vehicle key 283 on the basis of intermediate CA 1 281. The vehicle key 283 may include a private key and a public key of the vehicle 201.

Verification of the digital keys (for example, the first digital key 271 to the fourth digital key 274) may be performed through a CA certificate chain. The digital key verification may follow the specification defined in the CCC.

Figure 3A:
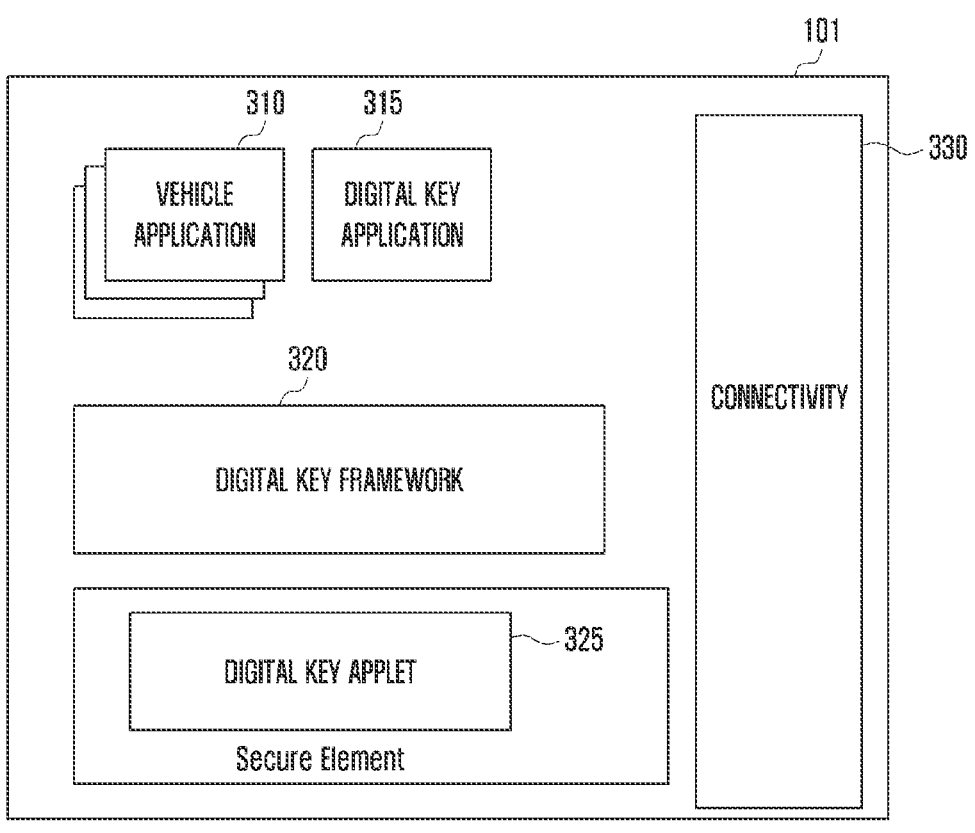

FIG. 3A is a diagram illustrating an example architecture in which an electronic device stores a digital key of a vehicle according to various embodiments.

Referring to FIG. 3A, an electronic device (for example, the electronic device 101 of FIG. 1) according to various embodiments may include at least one of a vehicle application 310, a digital key control application 315, a digital key framework 320, a digital key applet 325, and/or a connectivity (e.g., including communication circuitry) 330.

The vehicle application 310 or the digital key control application 315 may be an application used to control a digital key by the user of the electronic device 101.

The digital key framework 320 is to control the digital key applet 325 by the electronic device 101 and may provide an application programming interface (API) for connecting the vehicle application 310 or the digital key control application 315 and the digital key applet 325.

The digital key applet 325 may be stored in a secure element of the electronic device 101, and an encryption key or a certificate corresponding to the digital key may be stored.

The connectivity 330 may provide communication between the electronic device 101 and the vehicle (for example, the vehicle 201 of FIG. 2A). For example, the connectivity 330 may communicate with the vehicle 201 through at least one of Bluetooth, ultra wide band (UWB), and near field communication (NFC).

Figure 3B:
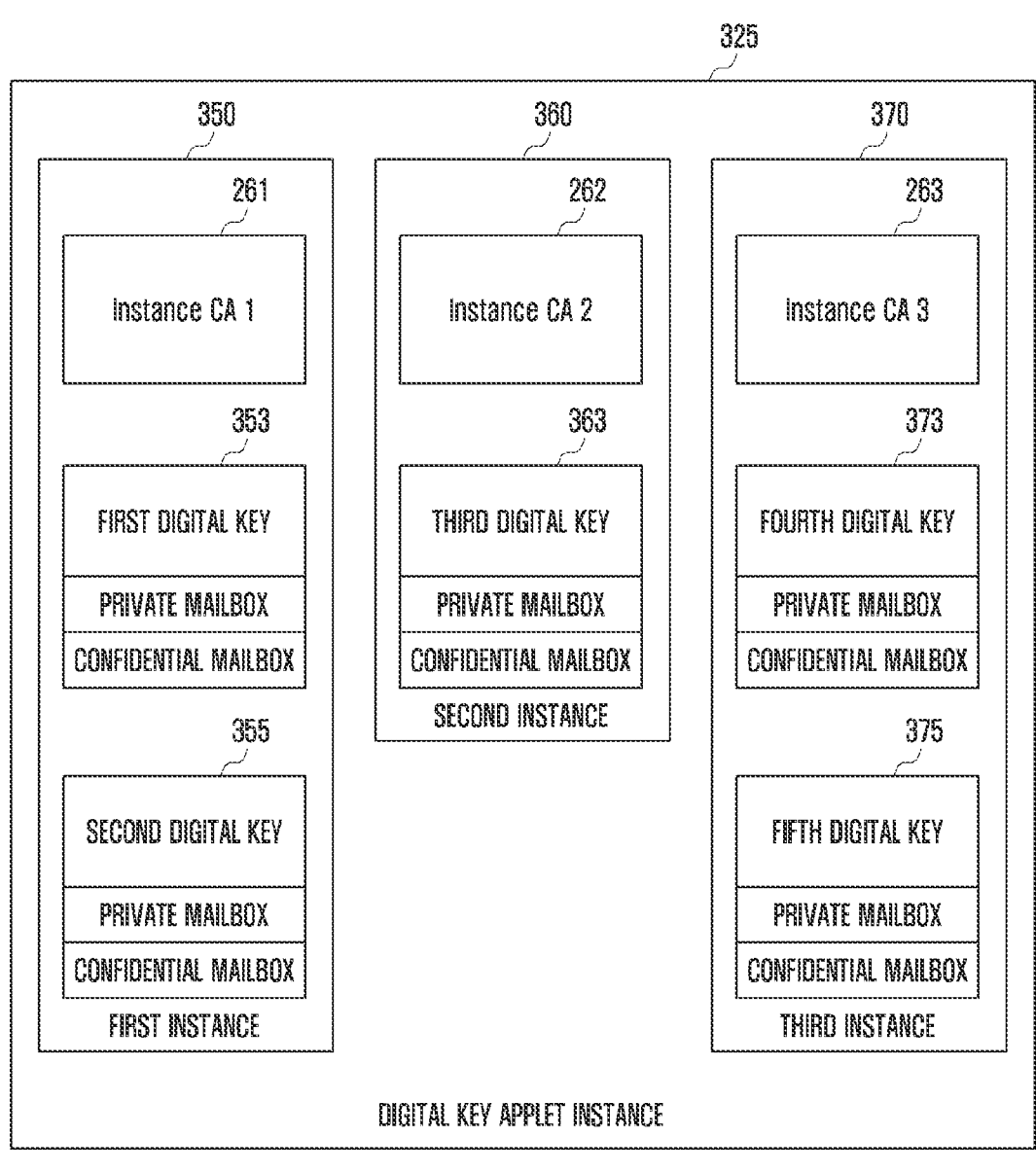

FIG. 3B is a diagram illustrating example instances of a digital key applet included in an electronic device according to various embodiments.

Referring to FIG. 3B, a digital key applet 325 may include instances therein. The digital key applet 325 may issue a certificate corresponding to the instance for each vehicle manufacturer of the vehicle 201 and store an encryption key related to the certificate. The digital key applet 325 may be issued several digital keys for each vehicle under the instances for respective vehicle manufacturers. For example, the digital key applet 325 may include a first instance 350 issued by a first vehicle manufacturer, a second instance 360 issued by a second vehicle manufacturer, and a third instance 370 issued by a third vehicle manufacturer. The digital key applet 325 including three difference instances may refer, for example, to three different vehicles being possessed or shared.

In the first instance 350, a first digital key 353 and a second digital key 355 may be signed by the first instance CA (for example, the first instance CA 261 of FIG. 2B). In the second instance 360, a third digital key 363 may be signed by the second instance CA (for example, the second instance CA 262 of FIG. 2A). In a third instance 370, a fourth digital key 373 and a fifth digital key 375 may be signed by the third instance CA (for example, the third instance CA 263 of FIG. 2B). When a plurality of digital keys are stored in one certificate, a plurality of vehicles of the same vehicle manufacturer may be possessed or shared.

For example, when the owner of the first electronic device 101 possesses or shared a first vehicle, the first electronic device 101 may be issued the first instance CA 261 corresponding to the first vehicle and store the first digital key 353 and the second digital key 355 on the basis of the first instance CA 261. For example, the first digital key 353 may be for the first vehicle of the first vehicle manufacturer and the second digital key 355 may be for the second vehicle of the first vehicle manufacturer.

Further, when the owner of the first electronic device 101 possesses or shares the second vehicle, the first electronic device 101 may be issued the second instance CA 262 corresponding to the second vehicle and store the third digital key 363 on the basis of the second instance CA 262. Alternatively, when the owner of the first electronic device 101 possesses or shares the third vehicle, the first electronic device 101 may be issued the third instance CA 263 corresponding to the third vehicle and store the fourth digital key 373 and the fifth digital key 375 on the basis of the third instance CA 263. For example, the fourth digital key 373 may be for the third vehicle of the third vehicle manufacturer and the fifth digital key 375 may be for the fourth vehicle of the third vehicle manufacturer.

Each digital key may include a private mailbox and a confidential mailbox. The private mailbox may include option information or proprietary information corresponding to the issued digital key. The driver identification information of the disclosure is option information and may be stored in the private mailbox. The proprietary mailbox may store an immobilizer token for staring the vehicle only when two-factor authentication is performed for security according to options of the vehicle manufacturer.

Figure 3C:
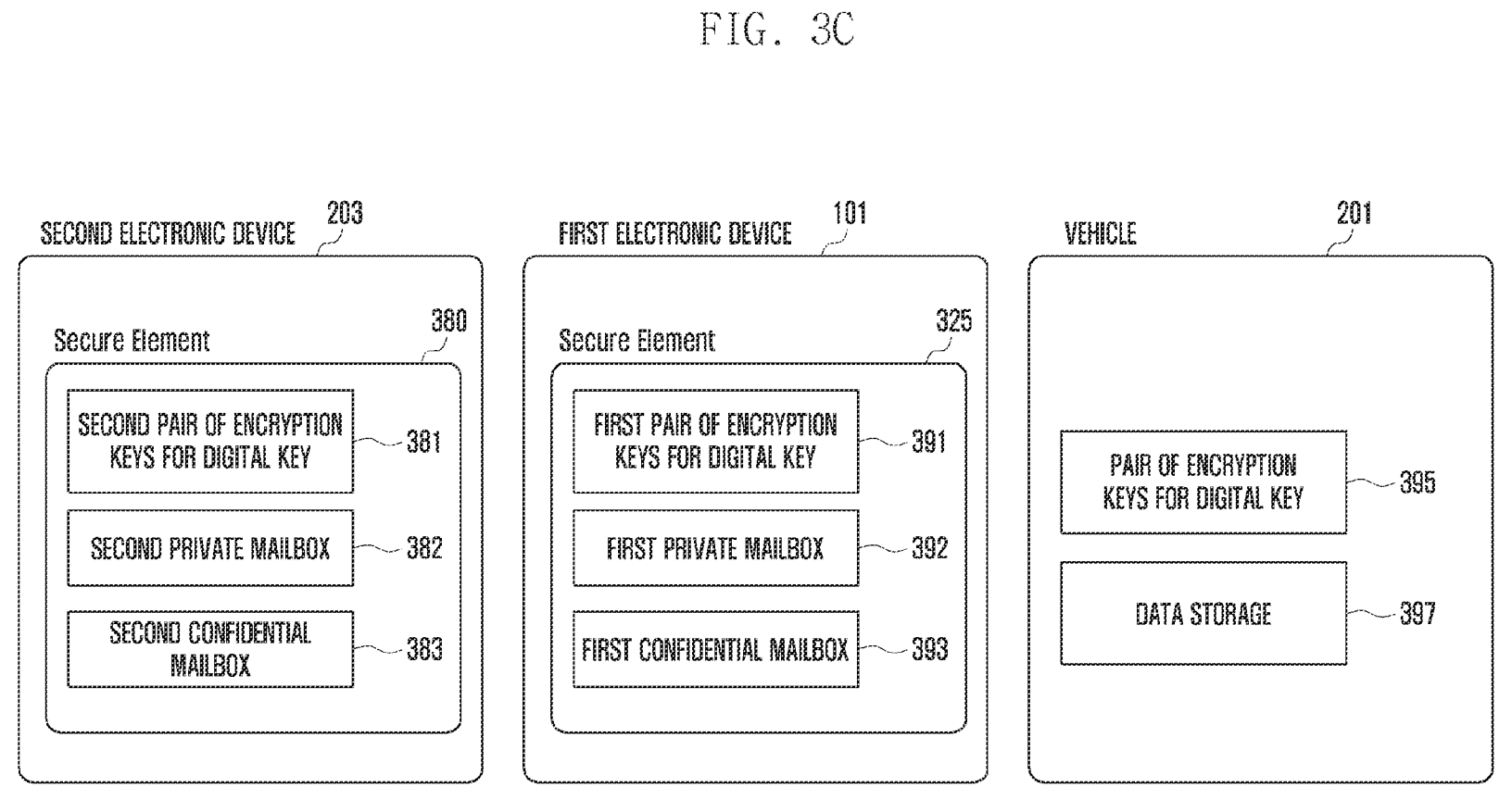

FIG. 3C is a diagram illustrating an example configuration of a mailbox of a digital key applet according to various embodiments.

Referring to FIG. 3C, the second electronic device 203 may include a second digital key applet 380, and the second digital key applet 380 may include a second pair of encryption keys for digital key 381, a second private mailbox 382, and a second proprietary mailbox 383. The digital key applet 325 included in the first electronic device 101 may include a first pair of encryption keys for digital key 391, a first private mailbox 392, and a first proprietary mailbox 393. The memory of the vehicle 101 may include a pair of encryption keys for digital key 395 and a data storage 397. The pair of encryption keys 395 stored in the vehicle 101 may include at least one of a pair of encryption keys for vehicle key (for example, a private key and a public key), the first pair of encryption keys for digital key 391, and the second pair of encryption keys for digital key 381. The data storage 397 may include configuration information for generating a digital key and, for example, driver identification information.

FIG. 4 is a diagram illustrating an example configuration of a mobile identity document service system according to various embodiments.

Referring to FIG. 4, the mobile identity document service system 400 may include a server 401, a reader device 405, and an electronic device (for example, the electronic device 101 of FIG. 1).

According to an embodiment, the identity document may include a certificate (or a real name certificate) managed by a national organization and capable of authenticating a user (for example, identifying a person's identity) such as an identity card (identity document), a driver's license, and/or a passport. According to an embodiment, a mobile identity document or a mobile identity document service may include a service which can use a physical identity document through the electronic device 101.

The server 401 may include, for example, a server of an issuing authority (CA) of the mobile identity document. According to an embodiment, the server 401 may store and manage identity information of the physical identity document. For example, identity information corresponding to a driver's license acquired by the user (for example, a licensed person) may be stored. According to an embodiment, the identity information may include, for example, personal information of the user such as a user name, an identification photo (for example, a face image), a date of birth, and/or sex, and information for identifying the user related to the acquired identity document of the user such as user signature, an identification number (for example, a license number), an issuing authority, and/or an updating period. For example, when the user of the electronic device 101 acquires a driver's license, information for identifying the user for the driver's license acquired by the user and private information of the user may be registered in the server 401.

The reader device 405 is a device of a verifier (for example, a person who identifying the user, for example, police or a seller of a store) and may acquire at least some information included in the mobile identity document from the electronic device 101 may include a device for verifying the user's identity on the basis of the mobile identity document.

The electronic device 101 may perform wireless communication with the server 401 through a first network (for example, a Wi-Fi network and/or a cellular network) and wireless communication with the reader device 405 through a second network (for example, an out of band (OOB) network), and may include various types of devices including a function of providing data related to a mobile identity document to the server 401 and/or the reader device 405. For example, the electronic device 101 may include a mobile device such as a smartphone, a tablet personal computer (PC), and/or a wearable device.

The electronic device 101 may be a holder for being issued a mobile identity document from the server 401 in a mobile identity document system, storing the mobile identity document in a secure area (for example, TA and/or eSE), and providing (for example, displaying or transmitting) at least some information of the mobile identity document according to a usage environment (for example, a device-based mode or a server-based mode) of the mobile identity document. According to various embodiments, the secure area may be a space (or an area) included in some areas of a memory (for example, the memory 130 of FIG. 1) or may be a separate chip physically separated from the memory 130. According to an embodiment, the electronic device 101 may verify whether identity information for the mobile identity document matches while interacting with the server 401. According to an embodiment, the electronic device 101 may provide at least one information of the mobile identity document through a predetermined authentication protocol with the reader device 405.

The device-based mode may indicate an example for providing a mobile identity document service in the state in which the mobile identity document (or mobile identity document data) is directly issued by the server 401 (for example, an issuing authority). The device-based mode may be an offline mode. Operations according to the device-based mode may include, for example, a device engagement operation and a data transfer (offline) operation.

The device engagement operation may include a pre-operation for the connection between the electronic device 101 and the reader device 405 for offline data transfer. For example, the electronic device 101 may include parameter values which should be configured with the reader device 405 for data transfer in device engagement data through an identification code (for example, a QR code and/or a barcode) or OOB communication (for example, NFC), and the reader device 405 may read device engagement data through the identification code or the OOB communication connection. According to an embodiment, the electronic device 101 may generate an ephemeral public key and insert the same in the device engagement data for end-to-end encryption communication.

The data transfer operation may include an operation in which the reader device 405 makes a request for desired mobile identity document data (or data element) to the electronic device 101 offline and the electronic device 101 provides the mobile identity document data requested by the reader device 405 offline. According to an embodiment, the reader device 405 may generate an ephemeral key, encrypt the ephemeral key by a session key, and make a request for mobile identity document data, and the electronic device 101 may perform encryption by a session key and provide mobile identity document data (for example, end-to-end encryption communication). According to an embodiment, the data transfer operation may be performed on the basis of an OOB communication (for example, BLE, NFC, UWB, Zigbee, and/or Wi-Fi 2.4 GHz communication) scheme between the electronic device 101 and the reader device 405.

The server-based mode may indicate an example in which a mobile identity document service is provided in the state in which the electronic device 101 is not issued the mobile identity document (or mobile identity document data) by the server 401. Operations according to the server-based mode may include, for example, a device engagement operation and a data transfer (offline) operation. The device-based mode may be an online mode.

The device engagement operation may include a pre-operation in which the electronic device 101 transmits mobile identity document data to the reader device 405 online. For example, the electronic device 101 may generate address information (for example, a URL) of the server 401 and a one-time token and insert the same into device engagement data, and the reader device 405 may read device engagement data through an identification code (for example, a QR code and/or a barcode) or OOB communication (for example, NFC).

According to an embodiment, the data transfer operation may include an operation in which the reader device 405 accesses the server 401 according to address information of the server 401 included in the device engagement data of the electronic device 101 and makes a request for mobile identity document data including the token received from the electronic device 101 to the server 401 online. According to an embodiment, the server 401 may identify the token acquired from the reader device 405 and transmit mobile identity document data requested by the reader device 405 to the reader device 405 online. A communication channel for online communication between the server 401 and the reader device 405 may be protected through encryption communication using a hypertext transfer protocol secure (HTTPS).

Hereinafter, various embodiments of the disclosure may include an operation example of the device-based mode in which the electronic device 101 operates in the state in which the mobile identity document is directly issued by the server 401 in a system structure for the mobile identity document service.

Figure 5:
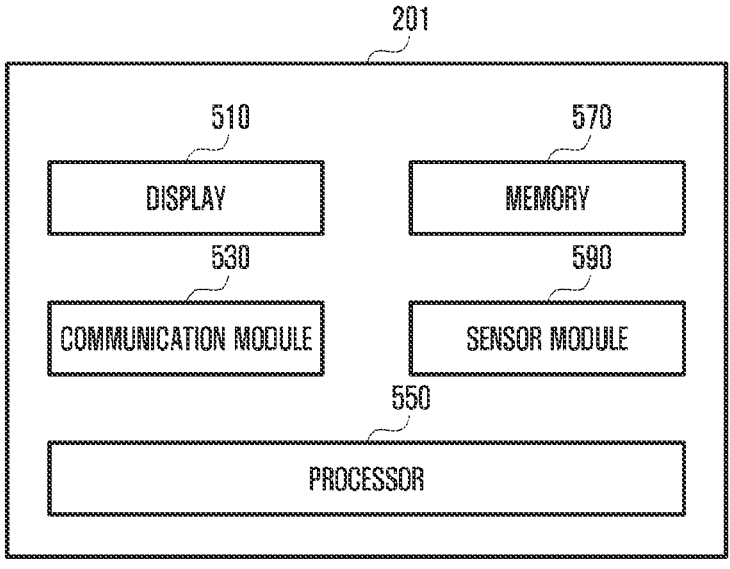
FIG. 5 is a block diagram illustrating an example configuration of a system of the vehicle according to various embodiments.

FIG. 5 is a block diagram illustrating an example configuration of a system of a vehicle according to various embodiments.

Referring to FIG. 5, the vehicle 201 system may include at least one of a display 510, a communication module (e.g., including communication circuitry) 530, a processor (e.g., including processing circuitry) 550, a memory 570 (for example, the memory 130 of FIG. 1), and/or a sensor module (e.g., including at least one sensor) 590 (for example, the sensor module 176 of FIG. 1). The vehicle 201 system may further include elements (for example, an audio module, a sound output module, and the like) more or fewer than illustrated.

The display 510 (for example, the display module 160 of FIG. 1) may visually provide information to the outside (for example, the user) of the vehicle 201. The display 510 may include, for example, a display, a hologram device, a projector, or a control circuit for controlling the corresponding device. According to an embodiment, the display 510 may include a touch sensor configured to detect a touch or a pressure sensor configured to measure the intensity of force generated by the touch.

The communication module 530 (for example, the communication module 190 of FIG. 1) may include various communication circuitry and support establishment of a direct (for example, wired) communication channel or a wireless communication channel between the vehicle 201 and an external electronic device (for example, the electronic device 101 or the server 108) or a wireless communication channel and communication through the established communication channel. The communication module 530 may include one or more communication processors which operate independently from the processor 550 (for example, application processor) and support direct (for example, wired) communication or wireless communication.

The processor 550 (for example, the processor 120 of FIG. 1) may include various processing circuitry and execute software (for example, the program 140) to control at least one other element (for example, a hardware or software component) of the vehicle 201 connected to the processor 550 and perform various data processing or calculations According to an embodiment, as at least a port of the data processing or calculations, the processor 550 may store instructions or data received from other elements (for example, the display 510 or the communication module 530) in the memory 570, process the instructions or data stored in the volatile memory 570, and store resultant data in the memory 570.

The processor 550 may communicate with the electronic device (for example, the electronic device 101 of FIG. 1) to perform owner pairing. During owner pairing, the processor 550 may receive mobile identity document information from the electronic device 101 and perform operation of FIG. 4 to authenticate the received mobile identity document information. When the mobile identity document information is successfully authenticated, the processor 550 may transmit vehicle information stored in the memory 570 to the electronic device 101. The processor 550 may insert the authenticated mobile identity document information into the vehicle information and transmit the vehicle information. The processor 550 may receive a digital key from the electronic device 101 and authenticate the received digital key.

For example, the processor 550 may determine whether the mobile identity document information included in the digital key corresponds to the mobile identity document information included in the vehicle information and, when they are the same as each other, sign the digital key by the private key of the vehicle 201. The private key of the vehicle 201 may be stored in the memory 570. The processor 550 may sign (or encrypt) the mobile identity document information by the private key of the vehicle 201 and generate driver identification information. The processor 550 may transmit the signed digital key and the generated driver identification information to the electronic device 101. The processor 550 may bind (or match) the signed digital key with the driver identification information and store the same in the memory 570.

When attempt of opening the door by the digital key is recognized, the processor 550 may authenticate the digital key. The processor 550 may authenticate the digital key by performing a mutual authentication protocol in order to identify whether the digital key is the same as the private key of the vehicle 201. After authenticating the digital key, the processor 550 may acquire mobile identity document information from the electronic device 101 and perform the operation of FIG. 4 to authenticate the mobile identity document information. When the mobile identity document is successfully authenticated, the processor 550 may receive driver identification information from the electronic device 101. The processor 550 may determine whether the received driver identification information is the same as the driver identification information bound with the signed digital key in the memory 570. The processor 550 may or may not allow the control of the vehicle 201 (for example, open the door, start the vehicle, or perform autonomous driving) on the basis of the determination result. For example, when the received driver identification information is the same as the driver identification information stored in the memory 570, the processor 550 may allow the control of the vehicle 201.

The processor 550 may receive a second digital key and second driver identification information corresponding to a second electronic device (for example, the electronic device 102 of FIG. 1 or the second electronic device 203 of FIG. 2A) from a vehicle server (for example, the vehicle server 230 of FIG. 2A) or the electronic device 101. The processor 550 may store the second digital key and the second driver identification information in the memory 570. When attempt of opening the door by the second digital key is recognized, the processor 550 may authenticate the second digital key and the second driver identification information. The processor 550 may or may allow the control of the vehicle 201 on the basis of the authentication result.

The memory 570 may store various pieces of data used by at least one element (for example, the processor 550 or the sensor module 590) of the vehicle 201. The data may include, for example, software and input data or output data related thereto. The memory 570 may include at least one of vehicle information of the vehicle 201, a pair of encryption keys for vehicle key (for example, a private key and a public key), a pair of encryption key for digital key, configuration information for generating a digital key, or driver identification information.

The sensor module 590 may include at least one sensor and detect an operation state (for example, power or temperature) of the vehicle 201 or an external environment state (for example, a user state) and generate an electrical signal or a data value corresponding to the detected state. According to an embodiment, the sensor module 590 may include a gesture sensor, a gyro sensor, an atmospheric pressure sensor, a magnetic sensor, an acceleration sensor, a proximity sensor, a color sensor, an Infrared (IR) sensor, a biometric sensor, a temperature sensor, a humidity sensor, and/or an illumination sensor.

The vehicle system may further include a camera tracking eyes of a driver (or a user) getting in the vehicle 201, a camera capturing the front side of the vehicle 201, lidar, laser, radar, an advanced driver assistance system (ADAS), and an autonomous vehicle system.

An electronic device (for example, the electronic device 101 of FIG. 1) according to various example embodiments of the disclosure may include: a communication module comprising communication circuitry (for example, the communication module 190 of FIG. 1), a memory (for example, the memory 130 of FIG. 1), and a processor (for example, the processor 120 of FIG. 1) operatively connected to at least one of the communication module and the memory, wherein the processor may be configured to: based on the electronic device being connected to a vehicle (for example, the vehicle 201 of FIG. 2A), transmit mobile identity document information stored in the memory to the vehicle through the communication module, receive vehicle information from the vehicle, generate a digital key of the vehicle based on the vehicle information or the mobile identity document information, transmit the generated digital key to the vehicle, receive a digital key signed by the vehicle and driver identification information from the vehicle, and store the signed digital key and the driver identification information in the memory.

The processor may be configured to: determine whether mobile identity document information included in the vehicle information corresponds to the mobile identity document information stored in the memory and, based on the mobile identity document information included in the vehicle information corresponding to the mobile identity document information stored in the memory, generate the digital key of the vehicle based on the vehicle information or the mobile identity document information.

The processor may be configured to: authenticate mobile identity document information included in the digital key by the vehicle, and based on the mobile identity document information included in the digital key being completely authenticated, receive the signed digital key and the driver identification information from the vehicle.

The signed digital key may be signed by a private key of the vehicle, and the driver identification information may include the mobile identity document information and may be signed by the private key of the vehicle.

The processor may be configured to: make a request for controlling the vehicle based on the digital key stored in the memory, based on the digital key and mobile identity document information corresponding to the electronic device being authenticated by the vehicle, transmit the driver identification information stored in the memory to the vehicle, and based on the driver identification information being authenticated by the vehicle, control the vehicle.

The processor may be configured to: based on the driver identification information not being authenticated by the vehicle, limit some functions of the vehicle.

The processor may be configured to: authenticate second mobile identity document information of a second electronic device based on a vehicle sharing request being received from the second electronic device, transmit vehicle information of the vehicle to the second electronic device based on the second mobile identity document information being completely authenticated, receive a second digital key from the second electronic device, and generate second driver identification information corresponding to the second electronic device.

The processor may be configured to generate the second driver identification information by signing the second digital key by the first digital key.

The processor may be configured to: bind the signed second digital key with the second driver identification information and store the bound signed second digital key and second driver identification information in the memory.

An electronic device (for example, the electronic device 101 of FIG. 1) included in a vehicle (for example, the vehicle 201 of FIG. 2A) according to various example embodiments of the disclosure may include: a communication module comprising communication circuitry (for example, the communication module 190 of FIG. 1), a memory (for example, the memory 130 of FIG. 1), and a processor (for example, the processor 120 of FIG. 1) operatively connected to at least one of the communication module and the memory, wherein the processor may be configured to: based on the electronic device being connected to a first external device, receive first mobile identity document information from the first external device through the communication module, authenticate the first mobile identity document information and transmit vehicle information of the vehicle stored in the memory to the first external device, receive a first digital key from the first external device and authenticate the first digital key, sign the first digital key based on the authentication of the first digital key, generate first driver identification information corresponding to the first mobile identity document information, and transmit the signed first digital key and the first driver identification information to the first external device.

The processor may be configured to: based on the first mobile identity document information being authenticated, insert the first mobile identity document information into the vehicle information and transmit the vehicle information to the first external device.

The processor may be configured to: determine whether mobile identity document information included in the first digital key corresponds to the first mobile identity document information included in the vehicle information and, based on the mobile identity document information included in the first digital key corresponding to the first mobile identity document information included in the vehicle information, sign the first digital key by a private key of the vehicle stored in the memory.

The processor may be configured to generate the first driver identification information to include the first mobile identity document information by performing signing by a private key of the vehicle stored in the memory.

The processor may be configured to: based on a request for controlling the vehicle being made, authenticate the first digital key stored in the first external device, authenticate the first mobile identity document information corresponding to the first external device, based on the authentication of the first digital key, and based on the first mobile identity document information being authenticated, read and authenticate first driver identification information stored in the first external device.

The processor may be configured to: allow the control of the vehicle based on the first driver identification information being authenticated, and limit some functions of the vehicle based on the first driver identification information not being authenticated.

The processor may be configured to: receive a second digital key and/or second driver identification information from the first external device and store the second digital key and/or the second driver identification information, authenticate the second digital key stored in a second external device based on a request for controlling the vehicle being made by the second external device, authenticate second mobile identity document information corresponding to the second external device, based on the authentication of the second digital key, and read and authenticate second driver identification information stored in the second external device based on the second mobile identity document information being authenticated.

The processor may be configured to allow the control of the vehicle based on the second driver identification information being authenticated, and limit some functions of the vehicle based on the second driver identification information not being authenticated.

Figure 6:
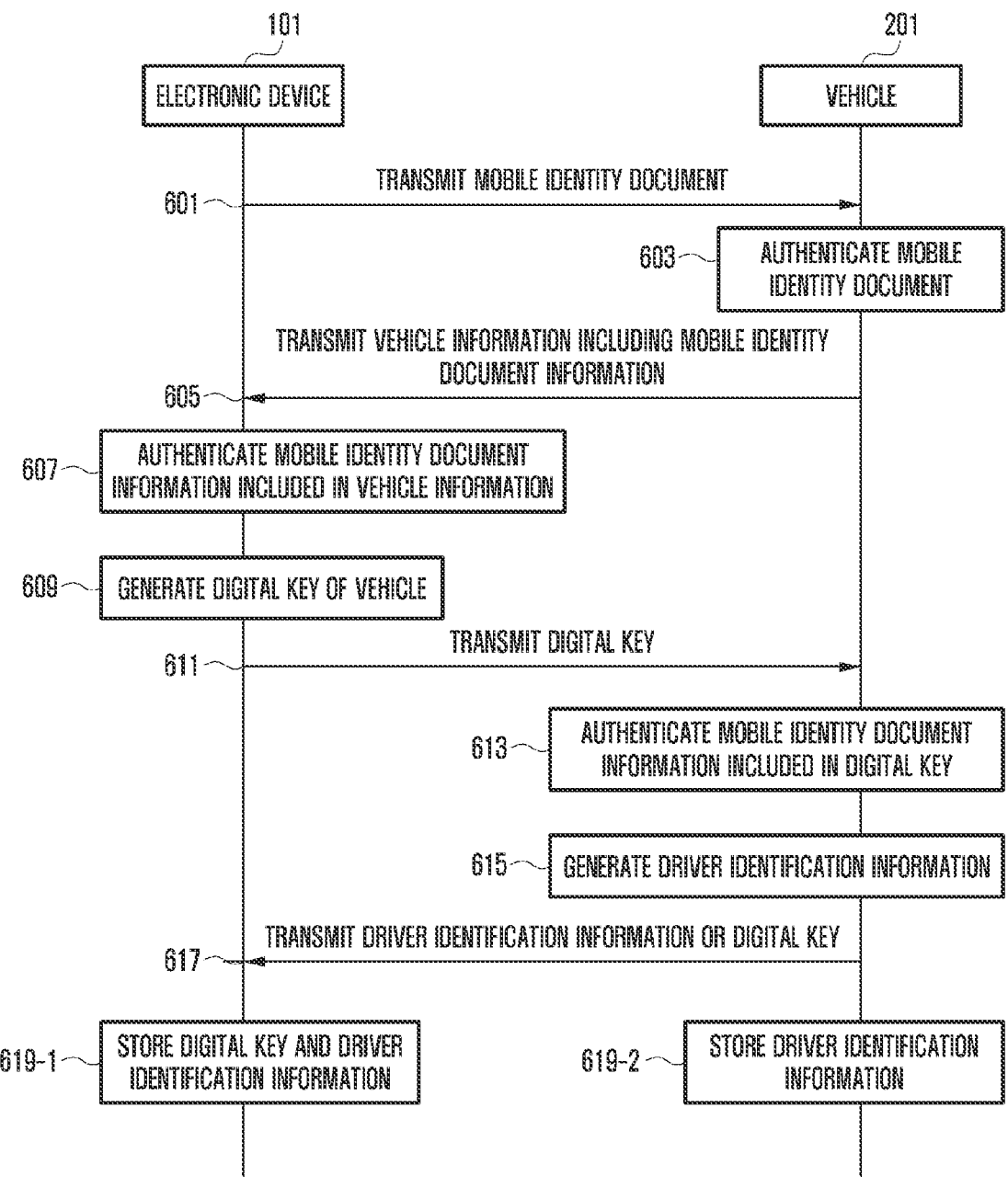
FIG. 6 is a signal flow diagram illustrating an example method by which the electronic device and the vehicle interwork to issue a digital key linked with a mobile identity document according to various embodiments.

FIG. 6 is a signal flow diagram illustrating an example method by which an electronic device and a vehicle interwork to issue a digital key linked with a mobile identity document according to various embodiments.

Referring to FIG. 6, in operation 601, an electronic device (for example, the electronic device 101 of FIG. 1) according to various embodiments may transmit a mobile identity document to a vehicle (for example, the vehicle 201 of FIG. 2A). The mobile identity document is to identify a driver of the vehicle 201 and may be a driver's license. The mobile identity document information may include mobile identity document signature information and MSO information. The mobile identity document signature information may include at least one of a digest ID, a random value, an information identifier of the mobile identity document (for example, a name, a date of birth, an issue date, an expiration date, an issuing authority, an identity document identification number (for example, a driver number), or a photo corresponding to the first user) or an information value of the mobile identity document.

The MSO information may include a value obtained by hashing a value included in mobile identification signature information. The MSO information may include at least one of an MSO version, a hash algorithm version, a digest value, device information, a doctype, or validity information. The electronic device 101 may be issued a mobile identity document in advance from an issuing authority (for example, the server 401 of FIG. 4) to issue a digital key and store the mobile identity document in a memory (for example, the memory 130 of FIG. 1). The electronic device 101 may transmit the mobile identity document stored in the memory 130 to the vehicle 201.

According to various embodiments, operation 601 may be performed when the owner of the vehicle 201 possesses a vehicle key (for example, a physical vehicle key) of the vehicle 201, gets in the vehicle 201, and makes a request for issuing a digital key. The vehicle 201 may recognize the physical vehicle key (for example, a smart key) corresponding to the vehicle 201 through a communication module (for example, the communication module 530 of FIG. 5) or a sensor module (for example, the sensor module 590 of FIG. 5). The physical vehicle key may be recognized and the vehicle 201 may receive a request for issuing the digital key through at least one of a menu displayed through a display (for example, the display 510 of FIG. 5), a configured button, or configured voice recognition. The vehicle 201 may establish encrypted communication with the electronic device 101 in response to the request for issuing the digital key and make a request for a mobile identity document to the electronic device 101.

In operation 603, the vehicle 201 may authenticate the mobile identity document. The vehicle 201 may receive the mobile identity document from the electronic device 201 and authenticate the received mobile identity document. A method of authenticating the mobile identity document may be performed in a device-based mode or a server-based mode, but may be performed in the device-based mode for security enforcement. The vehicle 201 may authenticate the mobile identity document by the operation described above with reference to FIG. 4.

When the mobile identity document is completely authenticated, the vehicle 201 may transmit vehicle information including mobile identity document information to the electronic device 101 in operation 605. The mobile identity document information may be the same as the information included in the mobile identity document or may include some information included in the mobile identity document. For example, the mobile identification information may include a digest ID or a digest of an identity document identification number (or a name corresponding to the first user) included in the mobile identity document. The vehicle 201 may insert the mobile identity document information into configuration information of the vehicle information (for example, endpoint configuration data).

According to various embodiments, the electronic device 101 may further transmit device information of the electronic device 101. The device information of the electronic device 101 may include at least one of a phone number, a serial number, a model name, or a type of the electronic device 101. The vehicle 201 may authenticate not only the mobile identity document but also the device information of the electronic device 101 and, when the mobile identity document and the device information of the electronic device 101 are completely authenticated, transmit the vehicle information to the electronic device 101.

In operation 607, the electronic device 101 may authenticate mobile identity document information included in the vehicle information. The electronic device 101 may receive vehicle information including the mobile identity document information from the vehicle 201. The electronic device 101 may determine whether the mobile identity document information included in the received vehicle information corresponds to the mobile identity document information stored in the memory 130. The mobile identity document information stored in the memory 130 may be mobile identity document information transmitted to the vehicle 201 in operation 601. For example, the electronic device 101 may identify whether the digest ID or the digest of the mobile identity document identification number of the received mobile identity document information is the same as the MSO information stored in the memory 130. The MSO information may include a value obtained by hashing data included in the mobile identity document information (for example, the mobile identity document signature information 413). The operation of determining whether the mobile identity document information included in the received vehicle information corresponds to the mobile identity document information stored in the memory 130 may be the authentication of the mobile identity document information.

According to various embodiments, when the mobile identity document information included in the vehicle information is not the same as the mobile identity document information stored in the memory 130, the electronic device 101 may not generate a digital key, may make a request for the vehicle information again or may download the mobile identity document information again from the issuing authority.

In operation 609, the electronic device 101 may generate a digital key of the vehicle 201 (for example, a pair of encryption keys). When the mobile identity document information is successfully authenticated, the electronic device 101 may generate the digital key on the basis of the device information or the mobile identity document information. The digital key is required for opening the door of the vehicle 201, starting the vehicle, or performing autonomous driving and may correspond to the physical vehicle key. The electronic device 101 may be issued a certificate from a first electronic device server (for example, the first electronic device server 250 of FIG. 2A) and generate the digital key on the basis of the certificate. The digital key may include the vehicle information or the mobile identity document information.

According to various embodiments, the electronic device 101 may generate the digital key by further using device information of the electronic device 101 (for example, a phone number, a serial number, a model name, or a type of the electronic device 101). In this case, the digital key may further include device information of the electronic device 101 as well as the vehicle information or the mobile identity document information. Since the digital key cannot be moved to another device, the digital key may be newly issued if the user replaces the electronic device (for example, with a new electronic device).

In operation 611, the electronic device 101 may transmit the generated digital key to the vehicle 201. The electronic device 101 may transmit the digital key to the vehicle 201 according to a protocol encrypted with the vehicle 201.

In operation 613, the vehicle 201 may authenticate mobile identity document information included in the digital key. The vehicle 201 may receive the digital key from the electronic device 101 and extract mobile identity document information included in the digital key. The vehicle 201 may determine whether the mobile identity document information included in the digital key corresponds to mobile identity document information inserted into the vehicle information. When the mobile identity document information included in the digital key corresponds to the mobile identity document information inserted into the vehicle information, the vehicle 201 may sign the digital key by the private key of the vehicle 201.

In operation 615, the vehicle 201 may generate driver identification information by signing the mobile identity document information by the private key of the vehicle 201. The generated driver identification information may include the mobile identity document information or may correspond to the mobile identity document information.

In operation 617, the vehicle 201 may transmit the generated driver identification information or the digital key signed by the private key of the vehicle 201 to the electronic device 101. The vehicle 201 may transmit the driver identification information or the signed digital key to the electronic device 101 according to a protocol encrypted with the electronic device 101.

In operation 619-1, the electronic device 101 may receive the generated driver identification information or the signed digital key and store the same in the memory 130. The electronic device 101 may bind (or match) the signed digital key with the driver identification information and store the same in the memory 130. For example, the electronic device 101 may store the signed digital key or the driver identification information in a private mailbox (for example, the private mailbox 392 of FIG. 3C) of a digital key applet (for example, the digital key applet 325 of FIG. 3A). The digital key received from the vehicle 201 has been signed by the private key of the vehicle 201, and thus may be different from the digital key transmitted to the vehicle 201.

In operation 619-2, the vehicle 201 may bind (or match) the signed digital key with the first driver identification information and store the same in the memory 570. Although it is illustrated that operation 619-2 is performed after operation 617, operation 619-2 may be performed between operation 615 and operation 617. Such a description is only to help understanding of the description, and the disclosure is not limited by the description.

Figure 7:
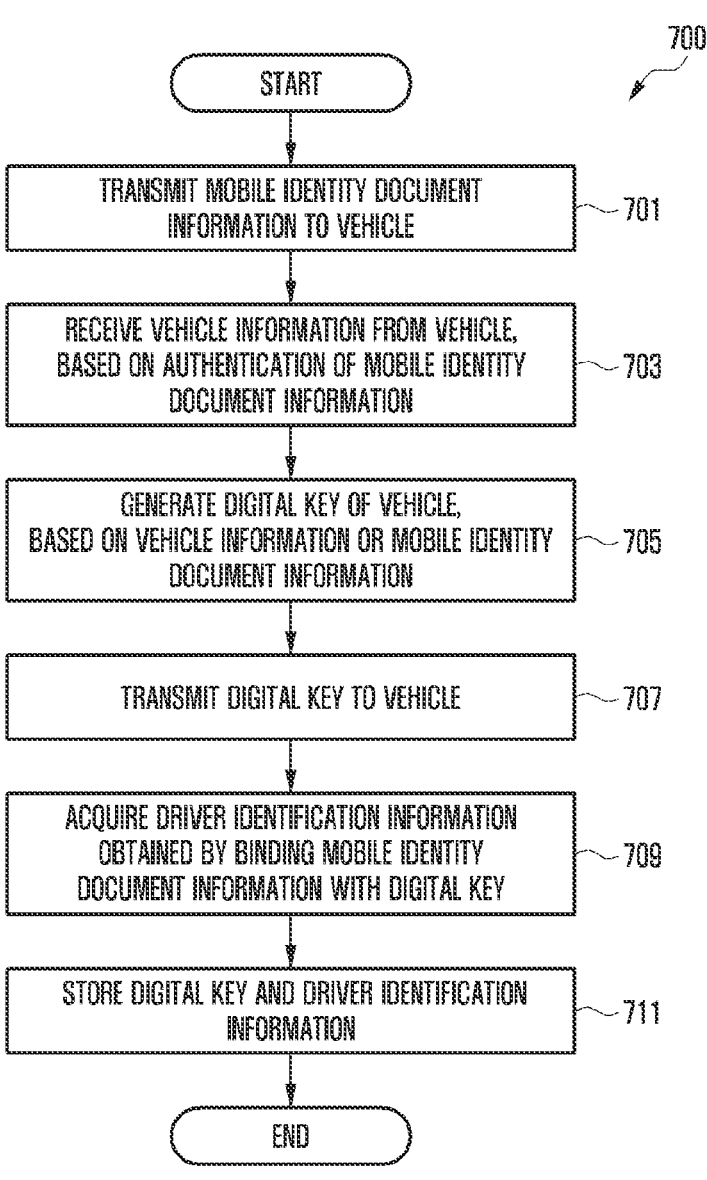
FIG. 7 is a flowchart illustrating an example method by which the electronic device issues a digital key linked with a mobile identity document according to various embodiments.

FIG. 7 is a flowchart 700 illustrating an example method by which an electronic device is issued a digital key linked with a mobile identity document according to various embodiments.

Referring to FIG. 7, in operation 701, a processor (for example, the processor 120 of FIG. 1) of an electronic device (for example, the electronic device 101 of FIG. 1) according to various embodiments may transmit mobile identity document information to a vehicle (for example, the vehicle 201 of FIG. 2A) through a communication module (for example, the communication module 190 of FIG. 1). The mobile identity document information may include mobile identity document signature information and MSO information. The processor 120 may be issued the mobile identity document in advance from an issuing authority (for example, the server 401 of FIG. 4) to issue a digital key and store the same in a memory (for example, the memory 130 of FIG. 1). The electronic device 101 may transmit the mobile identity document stored in the memory 130 to the vehicle 201.

According to various embodiments, the processor 120 may further transmit device information of the electronic device 101 through the communication module 190. The device information of the electronic device 101 may include at least one of a phone number, a serial number, a model name, or a type of the electronic device 101. The vehicle 201 may authenticate not only the mobile identity document but also device information of the electronic device 101.

In operation 703, the processor 120 may receive vehicle information from the vehicle 201 through the communication module 190 based on the authentication of the mobile identity document information. When the mobile identity document information transmitted by the vehicle 201 is the same as the mobile identity document of the driver of the vehicle 201, the processor 120 may receive the vehicle information. The vehicle information may include the mobile identity document information. The vehicle information may include the digest ID or the digest of the identity document identification number included in the mobile identity document.

In operation 705, the processor 120 may generate a digital key based on the device information or the mobile identity document information. Before generating the digital key, the processor 120 may authenticate the mobile identity document information included in the vehicle information. The processor 120 may determine whether the mobile identity document information included in the vehicle information corresponds to the mobile identity document information stored in the memory 130. For example, the processor 120 may identify whether the digest ID or the digest of the identity document identification number of the received mobile identity document information is the same as the MSO information stored in the memory 130. The MSO information is a value obtained by hashing mobile identity document information (for example, mobile identity document signature information), and thus the processor 120 may hash the digest ID or the digest of the identity document identification number and determine whether the digest ID or the digest is the same as the digest value of MSO. When the mobile identity document information included in the received vehicle information corresponds to the mobile identity document information stored in the memory 130, the processor 120 may generate a digital key on the basis of the device information or the mobile identity document information. The digital key may include the vehicle information or the mobile identity document information.

According to various embodiments, the processor 120 may generate the digital key by further using device information of the electronic device 101 (for example, a phone number, a serial number, a model name, or a type of the electronic device 101). In this case, the digital key may further include device information of the electronic device 101 as well as the vehicle information or the mobile identity document information. Since the digital key cannot be moved to another device, the digital key may be newly issued if the user replaces the electronic device (for example, with a new electronic device).

In operation 707, the processor 120 may transmit the generated digital key to the vehicle 201 through the communication module 190. The processor 120 may transmit the digital key to the vehicle 201 according to a protocol encrypted with the vehicle 201.

In operation 709, the processor 120 may acquire driver identification information obtained by binding the mobile identity document information with the signed digital key from the vehicle 201. The vehicle 201 may authenticate the digital key and, when the authentication is successfully completed, sign the digital key by the private key of the vehicle 201. Further, the vehicle 201 may generate driver identification information by signing the mobile identity document information by the private key of the vehicle 201. The generated driver identification information may include the mobile identity document information or may correspond to the mobile identity document information. The processor 120 may receive the digital key signed by the private key and the driver identification information from the vehicle 201.

In operation 711, the processor 120 may store the generated driver identification information or the signed digital key in the memory 130. The processor 120 may bind (or match) the signed digital key with the driver identification information and store the same in the memory 130. For example, the processor 120 may store the signed digital key or the driver identification information in a private mailbox (for example, the private mailbox 392 of FIG. 3C) of a digital key applet (for example, the digital key applet 325 of FIG. 3A).

FIG. 8 is a flowchart 800 illustrating an example method by which a vehicle issues a digital key linked with a mobile identity document according to various embodiments.

Referring to FIG. 8, in operation 801, a processor (for example, the processor 550 of FIG. 5) of a vehicle (for example, the vehicle 201 of FIG. 2A) may receive mobile identity document information (or a mobile identity document) from an electronic device (for example, the electronic device 101 of FIG. 1) through a communication module (for example, the communication module 530 of FIG. 5). Operation 801 may be performed when the owner of the vehicle 201 possesses a vehicle key (for example, a physical vehicle key) of the vehicle 201, gets in the vehicle 201, and makes a request for issuing a digital key. The processor 550 may recognize the physical vehicle key (for example, a smart key) corresponding to the vehicle 201 through the communication module 530 or a sensor module (for example, the sensor module 590 of FIG. 5). The processor 550 may recognize the physical vehicle key and receive the digital key issuing request through at least one of a menu displayed through a display (for example, the display 510 of FIG. 5), a configured button, or configured voice recognition. The processor 550 may establish encrypted communication with the electronic device 101 in response to the digital key issuing request, make a request for a mobile identity document to the electronic device 101, and receive the mobile identity document information from the electronic device 101.

In operation 803, the processor 550 may authenticate the mobile identity document information. A method of authenticating the mobile identity document may be performed in the device-based mode or the server-based mode as illustrated in FIG. 4, but may be performed in the device-based mode for security enhancement. The processor 550 may authenticate the mobile identity document by the operation described above with reference to FIG. 4.

When the mobile identity document is completely authenticated, the processor 550 may transmit vehicle information including mobile identity document information to the electronic device 101 through the communication module 530 in operation 805. The mobile identity document information may be the same as the information included in the mobile identity document or may include some information included in the mobile identity document. For example, the mobile identification information may include a digest ID or a digest of an identity document identification number (or a name corresponding to the first user) included in the mobile identity document. The vehicle 201 may insert the mobile identity document information into configuration information of the vehicle information (for example, endpoint configuration data).

In operation 807, the processor 550 may receive a digital key from the electronic device 101 through the communication module 530. The digital key may include the vehicle information or the mobile identity document information.

In operation 809, the processor 550 may authenticate mobile identity document information included in the digital key. The processor 550 may determine whether the mobile identity document information included in the digital key corresponds to the mobile identity document information inserted into the vehicle information. When the mobile identity document information included in the digital key corresponds to the mobile identity document information inserted into the vehicle information, the processor 550 may sign the digital key by the private key of the vehicle 201.

In operation 811, the processor 550 may generate driver identification information by binding the mobile identity document information with the signed digital key. The processor 550 may generate driver identification information by signing the mobile identity document information by the private key of the vehicle 201. The generated driver identification information may include the mobile identity document information or may correspond to the mobile identity document information.

In operation 813, the processor 550 may transmit the generated driver identification information or the digital key signed by the private key of the vehicle 201 to the electronic device 101 through the communication module 530 and may store the same. The processor 550 may bind (or match) the signed digital key with the first driver identification information and store the same in a memory (for example, the memory 570 of FIG. 5).

Figure 9:
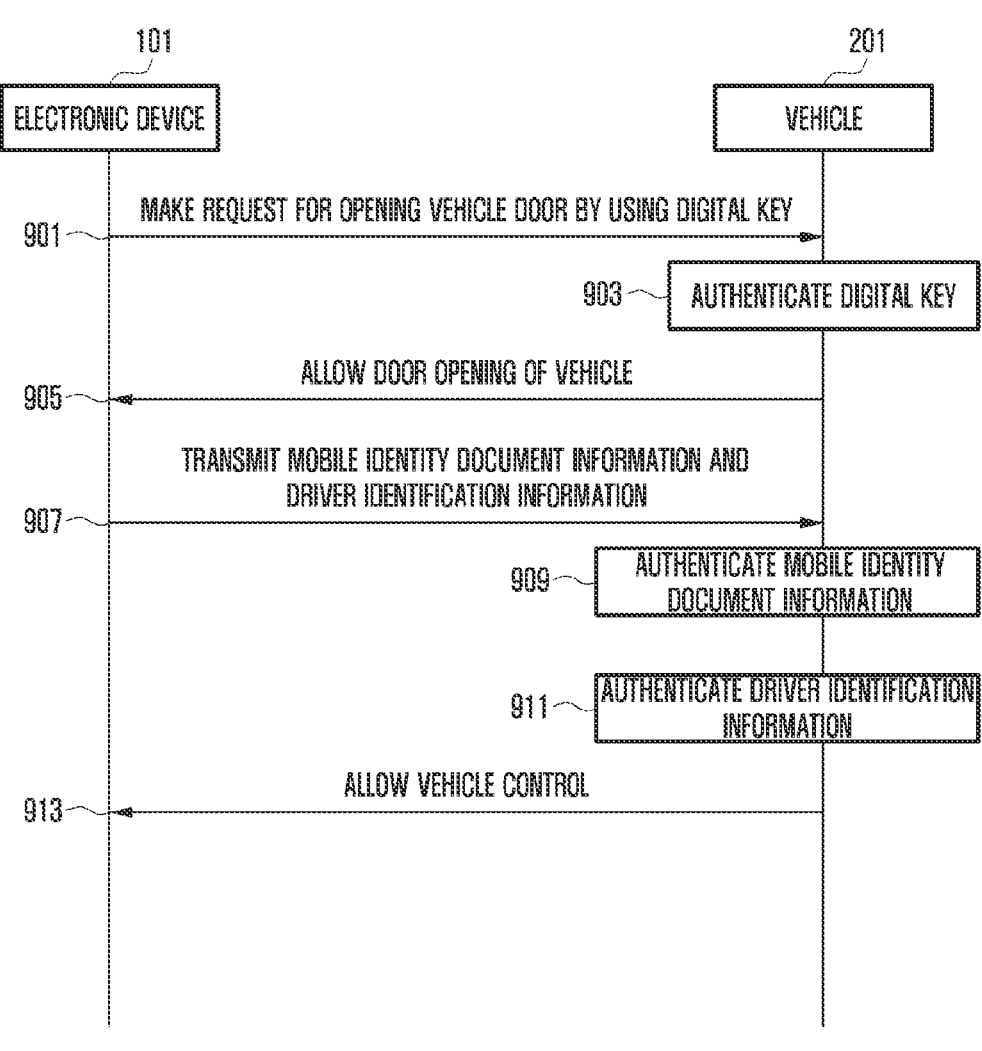
FIG. 9 is a signal flow diagram illustrating an example method of authenticating a digital key linked with a mobile identity document to control a vehicle according to various embodiments.

FIG. 9 is a signal flow diagram illustrating an example method of authenticating a digital key linked with a mobile identity document to control a vehicle according to various embodiments.

Referring to FIG. 9, in operation 901, an electronic device (for example, the electronic device 101 of FIG. 1) according to various embodiments may make a request for opening the door of a vehicle (for example, the vehicle 201 of FIG. 2A) using a digital key. The digital key may be stored in a digital key applet (for example, the digital key applet 325 of FIG. 3A) of the electronic device 101. The digital key applet 325 may store driver identification information. The user of the electronic device 101 may approach the vehicle 201 and execute a digital key application (for example, the digital key application 315 of FIG. 3A). The electronic device 101 and the vehicle 201 may perform a mutual authentication protocol by the digital key application 315.

In operation 903, the vehicle 201 may authenticate (or verify) the digital key. The digital key may be signed by the private key of the vehicle 201. The vehicle 201 may perform the mutual authentication protocol (for example, a certificate chain) with the electronic device 101 to verify the digital key. The verification of the digital key may follow the specification defined in the CCC.

When the digital key is completely authenticated, the vehicle 201 may allow door opening of the vehicle in operation 905. The vehicle 201 may not allow door opening when the authentication of the digital key has failed.

In operation 907, the electronic device 101 may transmit mobile identity document information and driver identification information to the vehicle 201. Although it is illustrated that both the mobile identity document information and the driver identification information are transmitted at once, they may be transmitted at different time points. For example, the electronic device 101 may first transmit the mobile identity document information, and when the mobile identity document information is completely authenticated by the vehicle 201, the vehicle 201 may read driver identification information stored in a private mailbox (for example, the private mailbox 392 of FIG. 3C) included in the digital key applet 325 of the electronic device 101.

In operation 909, the vehicle 201 may authenticate the mobile identity document information. The authentication of the mobile identity document information may correspond to the performance of the device-based operation of FIG. 4.

In operation 911, the vehicle 201 may authenticate the driver identification information. The vehicle 201 may signature-verify the driver identification information by the public key of the vehicle 201. The driver identification information is encrypted by the private key of the vehicle 201 and thus may be decrypted by the public key of the vehicle 201. When the driver identification information is decrypted by the public key of the vehicle 201, the vehicle 201 may determine that the authentication is successful. The vehicle 201 may determine whether the driver identification information corresponds to the mobile identity document information. For example, the vehicle 201 may identify whether a digest ID or a digest of an identity document identification number of the mobile identity document information is the same as MSO information.

When the driver identification information is successfully authenticated, the vehicle 201 may allow the control of the vehicle 201 in operation 913. The control of the vehicle 201 may include opening the door, starting the vehicle 201, or driving the vehicle 201 in an autonomous driving mode. The vehicle 201 may allow the overall control of the vehicle 201 only when the authentication of the driver identification information is successfully completed. When the authentication of the driver identification information is not successfully completed, the vehicle 201 may limit all or some of the control of the vehicle 201. For example, when the authentication of the driver identification information is not successfully completed, the vehicle 201 may allow door opening or staring of the vehicle 201 and may not allow the autonomous driving mode. When the authentication of the driver identification information is not successfully completed, the vehicle 201 may not allow door opening, staring, or the autonomous driving mode of the vehicle 201.

Figure 10:
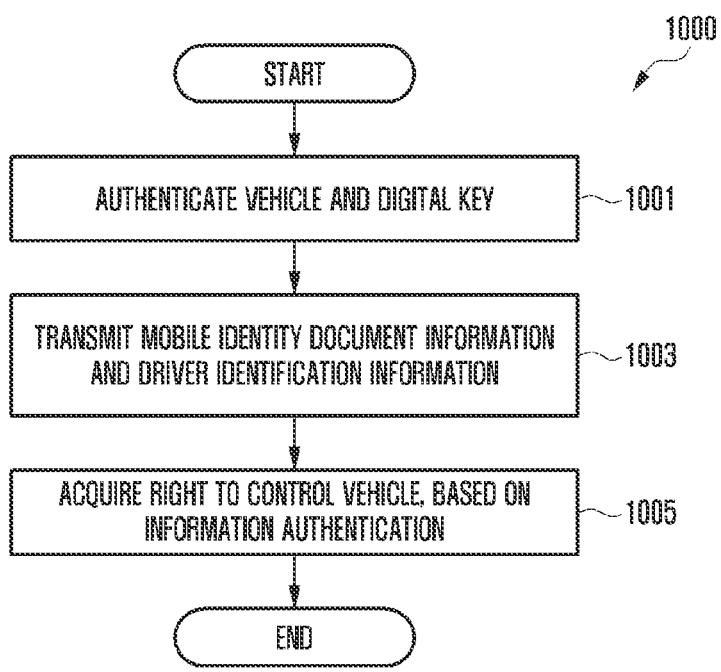
FIG. 10 is a flowchart illustrating an example method by which the electronic device controls the vehicle using a digital key according to various embodiments.

FIG. 10 is a flowchart 1000 illustrating an example method by which an electronic device controls a vehicle using a digital key according to various embodiments.

Referring to FIG. 10, in operation 1001, a processor (for example, the processor 120 of FIG. 1) of an electronic device (for example, the electronic device 101 of FIG. 1) according to various embodiments may authenticate a vehicle (for example, the vehicle 201 of FIG. 2A) and a digital key. The digital key may be stored in a digital key applet (for example, the digital key applet 325 of FIG. 3A) of a memory (for example, the memory 130 of FIG. 1) and signed by the private key of the vehicle 201. The digital key applet 325 may include driver identification information. The user of the electronic device 101 may approach the vehicle 201 and execute a digital key application (for example, the digital key application 315 of FIG. 3A). The processor 120 may perform a mutual authentication protocol with the vehicle 201 by the digital key application 315 and verify the digital key. The verification of the digital key may follow the specification defined in the CCC.

When the digital key is completely authenticated, the processor 120 may transmit mobile identity document information and driver identification information to the vehicle 201 through a communication module (for example, the communication module 190 of FIG. 1) in operation 1003. Although it is illustrated that both the mobile identity document information and the driver identification information are transmitted at once, they may be transmitted at different time points. For example, the processor 120 may first transmit the mobile identity document information and, when the mobile identity document information is completely authenticated by the vehicle 201, transmit the driver identification information. When the mobile identity document information is completely authenticated, the vehicle 201 may read driver identification information stored in a private mailbox (for example, the private mailbox 392 of FIG. 3C) included in the digital key applet 325 of the electronic device 101.

In operation 1005, the processor 120 may acquire a right to control the vehicle 201 on the basis of information authentication. The vehicle 201 may perform the device-based operation of FIG. 4 to authenticate the mobile identity document information. The vehicle 201 may signature-verify the driver identification information by the public key of the vehicle 201. For example, the driver identification information is encrypted by the private key of the vehicle 201 and thus may be decrypted by the public key of the vehicle 201. When the driver identification information is decrypted by the public key of the vehicle 201, the vehicle 201 may determine that the authentication is successful. When both the mobile identity document information and the driver identification information are successfully authenticated, the processor 120 may acquire the right to control the vehicle 201 from the vehicle 201. Alternatively, when the authentication of the driver identification information is not successfully completed, the right to control the vehicle 201 may be totally or partially limited. For example, when the authentication of the driver identification information is not successfully completed, the vehicle 201 may allow door opening or starting of the vehicle 201 and may not all the autonomous driving mode.

Figure 11:
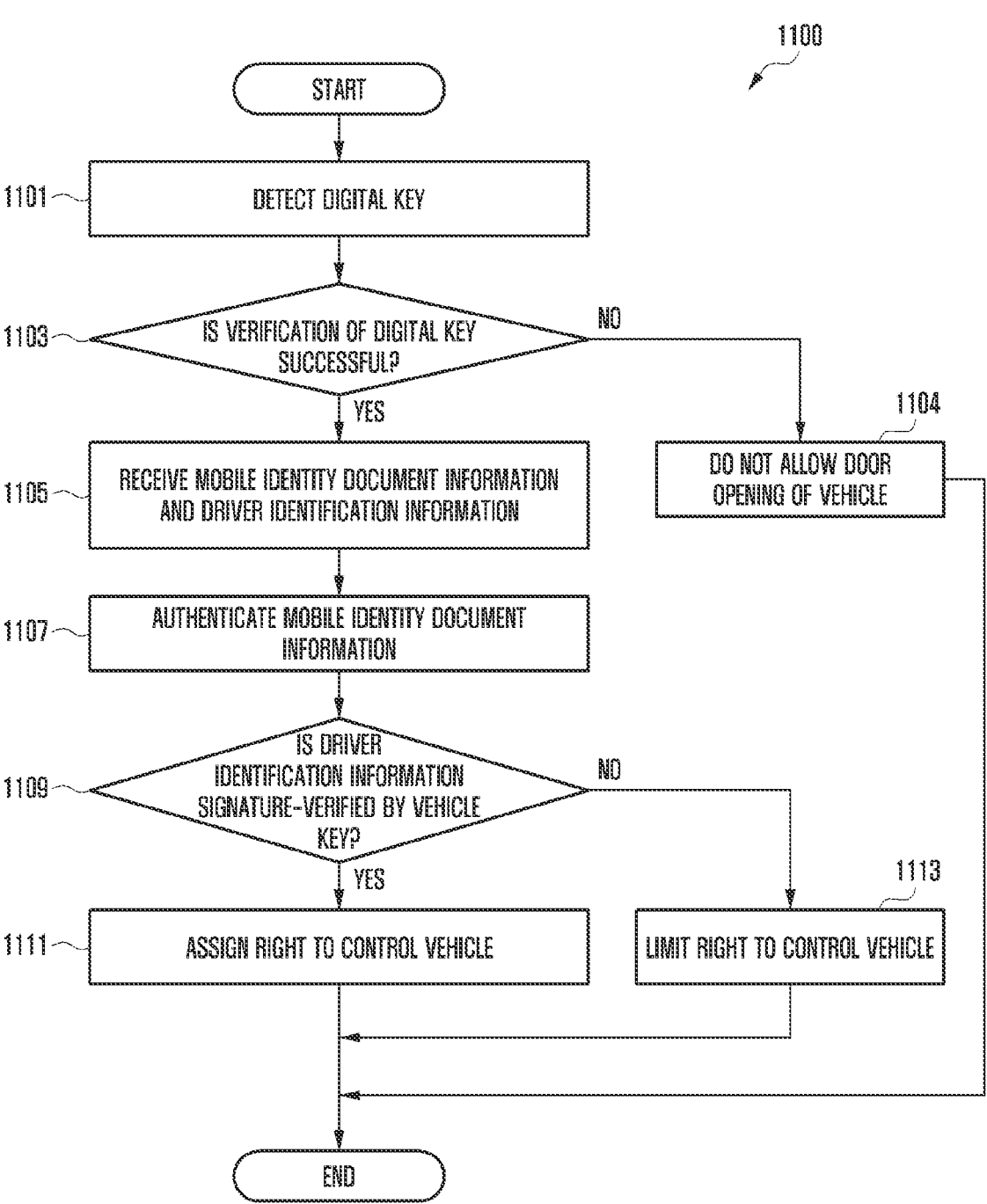
FIG. 11 is a flowchart illustrating an example method by which the vehicle allows the control of the vehicle by authenticating a digital key according to various embodiments.

FIG. 11 is a flowchart 1100 illustrating an example method by which a vehicle authenticates a digital key and allows the control the vehicle according to various embodiments.

Referring to FIG. 11, in operation 1101, a processor (for example, the processor 550 of FIG. 5) of a vehicle (for example, the vehicle 201 of FIG. 2A) may detects a digital key. When an electronic device (for example, the electronic device 101 of FIG. 1) including the digital key approaches or a digital key application is executed, the processor 550 may detect the digital key. The processor 550 may detect the digital key through a communication module (for example, the communication module 530 of FIG. 5) or a sensor module (for example, the sensor module 590 of FIG. 5).

In operation 1103, the processor 550 may verify the digital key and determine whether the digital key is successfully verified. The digital key may be signed by the private key of the vehicle 201. The processor 550 may verify the digital key by performing a mutual authentication protocol (for example, certificate chain verification) with the electronic device 101. The verification of the digital key may follow the specification defined in the CCC.

The processor 550 may perform operation 1105 when the verification of the digital key is successful, and may perform operation 1104 when the verification of the digital key fails.

When the verification of the digital key fails, the processor 550 may not allow door opening of the vehicle 201 in operation 1104.

When the verification of the digital key is successful, the processor 550 may receive mobile identity document information and driver identification information from the electronic device 101 through the communication module 530 in operation 1105. Although it is illustrated that both the mobile identity document information and the driver identification information are transmitted at once, they may be transmitted at different time points.

In operation 1107, the processor 550 may authenticate the mobile identity document information. The processor 550 may authenticate the mobile identity document information by performing the device-based operation of FIG. 4.

In operation 1109, the processor 550 may determine whether the driver identification information is signature-verified by the public key of the vehicle 201. The driver identification information is encrypted by the private key of the vehicle 201 and thus may be decrypted by the public key of the vehicle 201. When the driver identification information is decrypted by the public key of the vehicle 201, the vehicle 201 may determine that the authentication is successful.

The processor 550 may perform operation 1111 when the driver identification information is signature-verified by the public key of the vehicle 201, and perform operation 1113 when the driver identification information is not signature-verified by the public key of the vehicle 201.

When the driver identification information is signature-verified by the public key of the vehicle 201, the processor 550 may allow (or assign) a right to control the vehicle in operation 1111. The control of the vehicle 201 may include opening the door of the vehicle 201, starting the vehicle 201, or driving the vehicle 201 in an autonomous driving mode. The vehicle 201 may allow the overall control of the vehicle 201 only when the authentication of the driver identification information is successfully completed.

When the driver identification information is not signature-verified by the public key of the vehicle 201, the processor 550 may limit the right to control the vehicle in operation 1113. The processor 550 may totally or partially limit the control of the vehicle 201. For example, the processor 550 may allow door opening or starting of the vehicle 201 and may not allow the autonomous driving mode. Alternatively, the processor 550 may not allow door opening, staring, or the autonomous driving mode of the vehicle 201.

Figure 12:
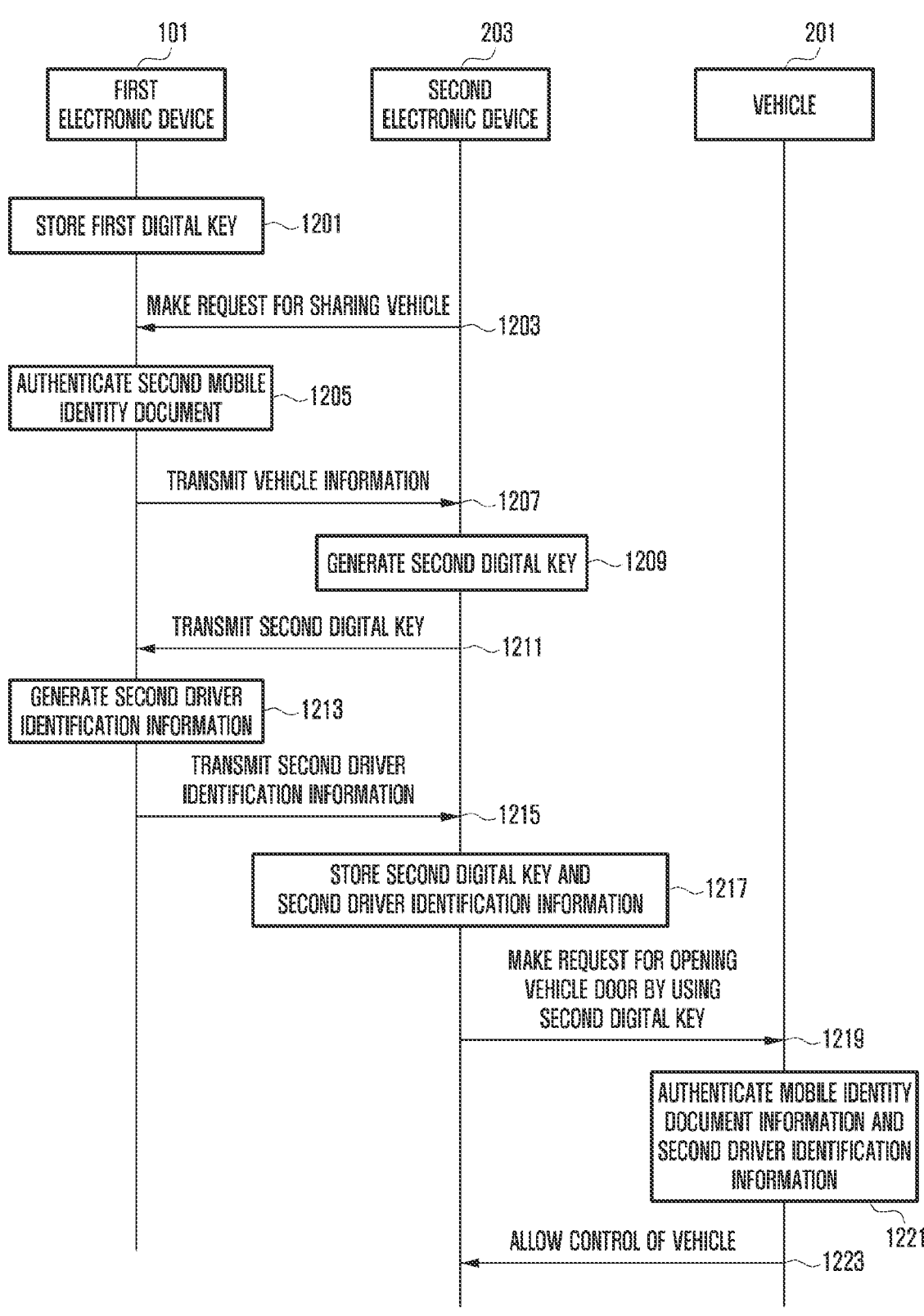
FIG. 12 is a signal flow diagram illustrating an example method of sharing a digital key according to various embodiments.

FIG. 12 is a signal flow diagram illustrating an example method of sharing a digital key according to various embodiments.

Referring to FIG. 12, in operation 1201, a first electronic device (for example, the electronic device 101 of FIG. 1) according to various embodiments may store a first digital key of a vehicle (for example, the vehicle 201 of FIG. 2A) in a memory (for example, the memory 130 of FIG. 1). Hereinafter, the electronic device 101 is referred to as the first electronic device 101 in order to be distinguished from the second electronic device 203. Further, the digital key stored in the first electronic device 101 may be referred to as a 'first digital key' in order to be distinguished from a second digital key. The first electronic device 101 is stored in a first digital key applet (for example, the digital key applet 325 of FIG. 3A) of the memory 130. The digital key applet 325 may store first driver identification information. Operation 1201 corresponds to the state in which owner pairing is completed and may be an operation performed after, for example, the operation of FIG. 6 is completed. The first digital key may be used to control the vehicle 201 (for example, open the door, start the vehicle, or perform autonomous driving).

In operation 1203, a second electronic device (for example, the electronic device 102 of FIG. 1 or the second electronic device 203 of FIG. 2A) may make a request for sharing the vehicle to the first electronic device 101. The first electronic device 101 may include a first user possessing the vehicle 201 or a vehicle sharing company (or a server). The second electronic device 203 may be an electronic device of a second user desiring to share the vehicle.

In operation 1205, the first electronic device 101 may authenticate second mobile identity document information in response to the request. The second mobile identity document may be an identity document corresponding to the second user of the second electronic device 203, and the first mobile identity document may be an identity document corresponding to the first user of the first electronic device 101. The first electronic device 101 may perform an operation corresponding to the reader device 405 of the mobile identity document service system 400. The first electronic device 101 may authenticate the second mobile identity document information in the device-based mode or the server-based mode of FIG. 4. The first electronic device 101 may perform operation 1207 when the authentication of the second mobile identity document information is successfully completed. When the authentication of the second mobile identity document information fails, the first electronic device 101 may re-authenticate the second mobile identity document information to the second electronic device 203.

In operation 1207, the first electronic device 101 may transmit vehicle information to the second electronic device 203. On behalf of the vehicle 201, the first electronic device 101 may transmit vehicle information of the vehicle 201 to the second electronic device 203. The first electronic device 101 may transmit the vehicle information to the second electronic device 203 through a vehicle server (for example, the vehicle server 230 of FIG. 2A) or acquire the vehicle information from the first digital key, and transmit the vehicle information to the second electronic device 203. According to various embodiments, the first electronic device 101 may insert the second mobile identity document information into the vehicle information and transmit the vehicle information.

In operation 1209, the second electronic device 203 may generate a second digital key on the basis of the vehicle information. The second electronic device 203 may generate the second digital key on the basis of a certificate issued by a second electronic device server (for example, the second electronic device server 210 of FIG. 2A). According to various embodiments, the second electronic device 203 may determine whether the second mobile identification information included in the vehicle information corresponds to the second mobile identification information stored in the memory and, when they are the same as each other, generate the second digital key on the basis of the vehicle information. The second electronic device 203 may generate the second digital key on the basis of the vehicle information and the second mobile identity document information.

In operation 1211, the second electronic device 203 may transmit the generated second digital key to the first electronic device 101.

In operation 1213, the first electronic device 101 may receive the second digital key from the second electronic device 203 and generate second driver identification information. The first electronic device 101 may generate second driver identification information by signing the second digital key by the first digital key. The second driver identification information may include the second mobile identity document information (for example, a digest ID and a digest corresponding to a driver identification number) of the second electronic device 203 or may correspond to second mobile identity document information. The first electronic device 101 may sign the second digital key by the first digital key.

In operation 1215, the first electronic device 101 may transmit the signed second digital key or the second driver identification information to the second electronic device 203. The first electronic device 101 may bind the signed second digital key with the second driver identification information (for example, a digest ID and a digest corresponding to a driver identification information in arbitrary-_data of an authorized endpoint attestation data field) and store the same in the memory 130.

In operation 1217, the second electronic device 203 may store the signed second digital key and the second driver identification information. The second electronic device 203 may store the signed second digital key and the second driver identification information in a private mailbox (for example, the second private mailbox 362 of FIG. 3C) of a second digital key applet (for example, the second digital key applet 380 of FIG. 3C).

In operation 1219, the second electronic device 203 may make a request for opening the door of the vehicle 201 using the second digital key. The second electronic device 203 may approach the vehicle 201 and execute a digital key application to make a request for opening the door of the vehicle 201.

In operation 1221, the vehicle 201 may authenticate the second mobile identity document information and the second driver identification information. According to various embodiments, the first electronic device 101 may transmit the signed second digital key or the second driver identification information to the vehicle 201. Alternatively, the signed second digital key or the second driver identification information may be transferred to the vehicle 201 through the vehicle server 230. The vehicle 201 may store the signed second digital key or the second driver identification information. When a request (or attempt) for controlling the vehicle 201 (for example, opening the door, starting the vehicle, or performing autonomous driving) is made by the second electronic device 203, the vehicle 201 may authenticate the signed second digital key. The signed second digital key may be signed by the first digital key. The verification of the second digital key may follow the specification defined in the CCC.

The vehicle 201 may authenticate the second digital key identically or similarly to the authentication of the first digital key. Further, the vehicle 201 may authenticate the second mobile identity document of the second user of the second electronic device 203 by performing the operation of FIG. 4 and, when the second mobile identity document information is successfully authenticated, authenticate the second driver identification information. The vehicle 201 may read and authenticate the second driver identification information stored in the second private mailbox 382 of the second digital applet 380 of the second electronic device 203.

In operation 1223, the vehicle 201 may allow the control of the vehicle on the basis of the authentication of the information. The vehicle 201 may signature-verify the second driver identification information by the first digital key. When the second mobile identity document information and the second driver identification information are successfully authenticated, the vehicle 201 may allow the second electronic device 203 to control the vehicle. When the authentication of at least one of the second mobile identity document information and the second driver identification information fails, the vehicle 201 may not allow the second electronic device 203 to control the vehicle. When the authentication of the second driver identification information is not successfully completed, the right to control the vehicle 201 may be totally or partially limited. For example, when the authentication of the second driver identification information is not successfully completed, the vehicle 201 may allow door opening or starting the vehicle 201 and may not allow the autonomous driving mode.

Figure 13:
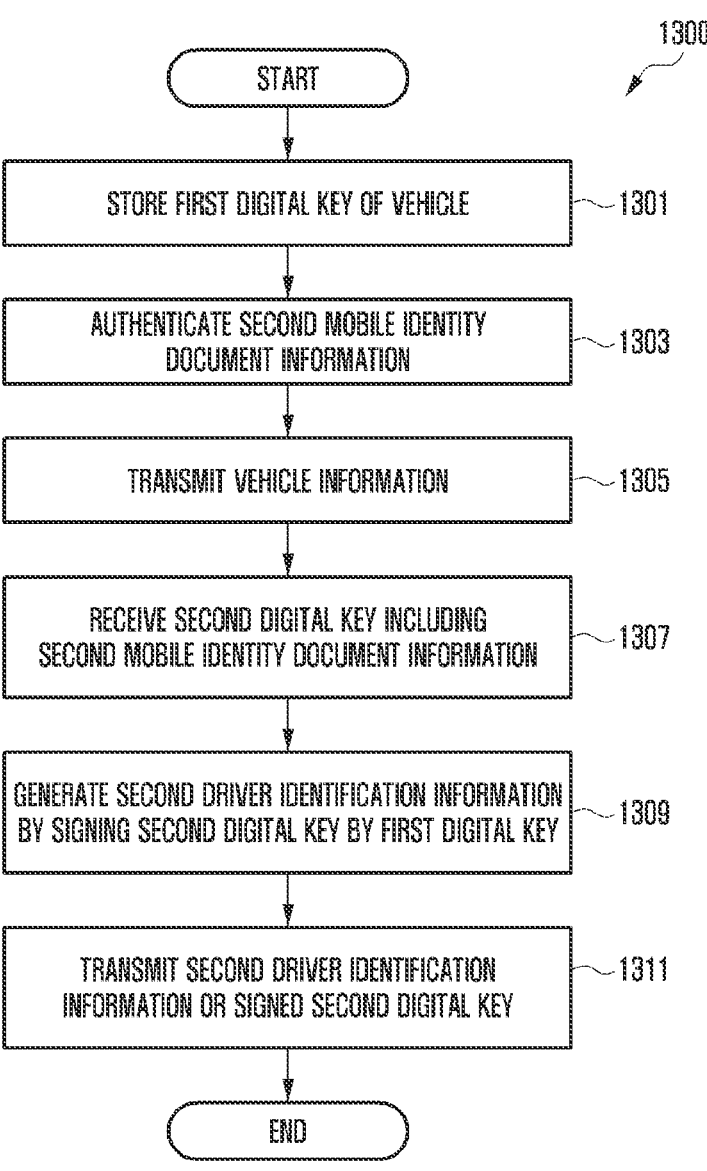
FIG. 13 is a flowchart illustrating an example method by which a first electronic device shares a digital key according to various embodiments.

FIG. 13 is a flowchart 1300 illustrating an example method by which a first electronic device shares a digital key according to various embodiments.

Referring to FIG. 13, in operation 1301, a processor (for example, the processor 120 of FIG. 1) of a first electronic device (for example, the electronic device 101 of FIG. 1) according to various embodiments may store a digital key of a vehicle (for example, the vehicle 201 of FIG. 1A) in a memory (for example, the memory 130 of FIG. 1). The first digital key may be stored in a digital key applet (for example, the digital key applet 325 of FIG. 3A) of the memory (for example, the memory 130 of FIG. 1) and signed by the private key of the vehicle 201. The digital key applet 325 may store first driver identification information. The first electronic device 101 may include a first user possessing the vehicle 201 or a vehicle sharing company (or a server).

In operation 1303, the processor 120 may authenticate second mobile identity document information. The processor 120 may receive a vehicle sharing request from a second electronic device (for example, the electronic device 102 of FIG. 1 or the second electronic device 203 of FIG. 2A). The second electronic device 203 may be an electronic device of a second user desiring to share the vehicle. The processor 120 may authenticate second mobile identity document information corresponding to the second user of the second electronic device 203 in response to the vehicle sharing request. The processor 120 may perform an operation corresponding to the reader device 405 of the mobile identity document service system 400. The processor 120 may authenticate the second mobile identity document information in the device-based mode or the server-based mode of FIG. 4.

When the second mobile identity document information is successfully authenticated, the processor 120 may transmit vehicle information to the second electronic device 203 in operation 1305. On behalf of the vehicle 201, the processor 120 may transmit vehicle information of the vehicle 201 to the second electronic device 203. The processor 120 may transmit the vehicle information to the second electronic device 203 through a vehicle server (for example, the vehicle server 230 of FIG. 2A) or acquire the vehicle information from the first digital key, and transmit the vehicle information to the second electronic device 203. According to various embodiments, the processor 120 may insert the second mobile identity document information into the vehicle information and transmit the vehicle information.

In operation 1307, the processor 120 may receive a second digital key from the second electronic device 203. The second digital key may include the vehicle information. The second digital key may include the vehicle information and the second mobile identity document information. The processor 120 may sign the second digital key by the first digital key.

In operation 1309, the processor 120 may generate second driver identification information by signing the second digital key by the first digital key. The second driver identification information may include the second mobile identity document information (for example, a digest ID and a digest corresponding to a driver identification number) of the second electronic device 203 or may correspond to second mobile identity document information.

In operation 1311, the processor 120 may transmit the second driver identification information or the signed second digital key to the second electronic device 203. The processor 120 may bind the signed second digital key with the second driver identification information (for example, a digest ID and a digest corresponding to a driver identification information in arbitrary_data of an authorized endpoint attestation data field) and store the same in the memory 130.

Figure 14:
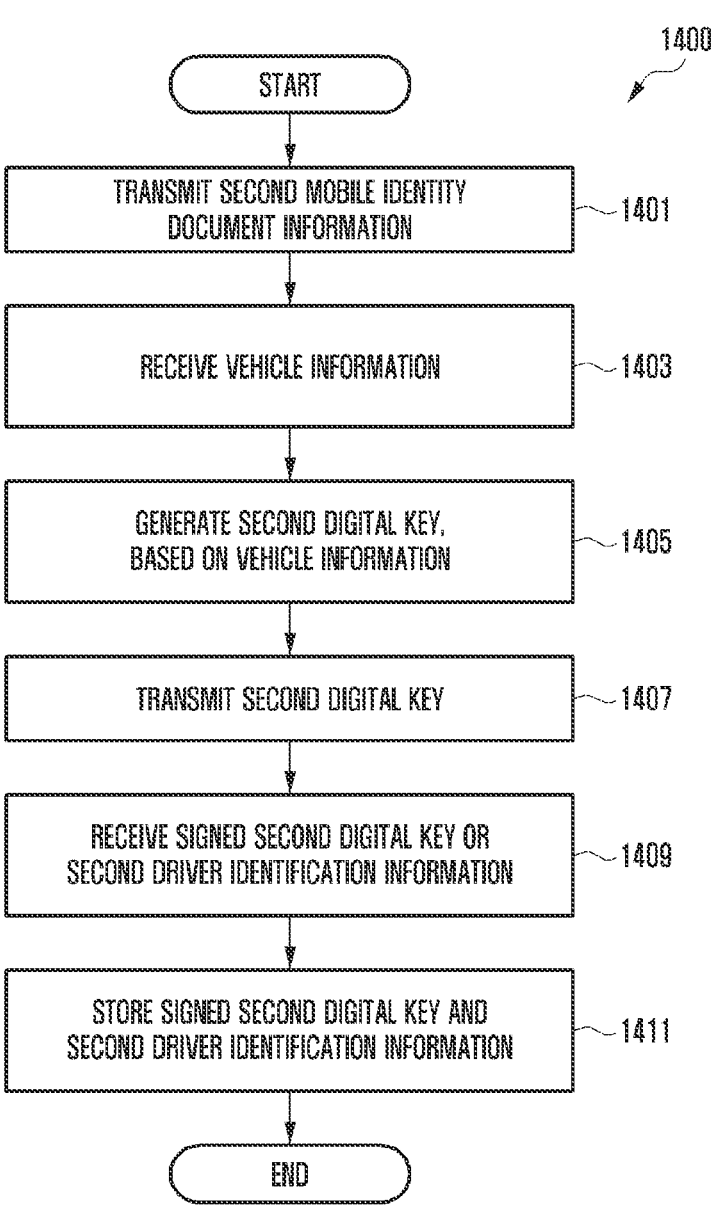
FIG. 14 is a flowchart illustrating an example method by which a second electronic device shares a digital key according to various embodiments.

FIG. 14 is a flowchart 1400 illustrating an example method by which a second electronic device shares a digital key according to various embodiments.

Referring to FIG. 14, in operation 1401, a processor (for example, the processor 120 of FIG. 1) of a second electronic device (for example, the second electronic device 203 of FIG. 2A) according to various embodiments may transmit second mobile identity document information to a first electronic device (for example, the electronic device 101 of FIG. 1). The second mobile identity document information may correspond to a second user of the second electronic device 203. The processor 120 may transmit the second mobile identity document information to the first electronic device 101 (for example, in the device-based mode) or transmit address information and a one-time token through which the second mobile identity document information can be issued to the first electronic device 101 (for example, in the server-based mode). The first electronic device 101 may include a first user possessing the vehicle 201 or a vehicle sharing company (or a server). The second electronic device 203 may be an electronic device of a second user desiring to share the vehicle.

In operation 1403, the processor 120 may receive vehicle information from the first electronic device 101 through a communication module (for example, the communication module 190 of FIG. 1). The first electronic device 101 may authenticate the second mobile identity document information by performing the operation of FIG. 4 and when the authentication is successfully completed, transmit vehicle information of a vehicle (for example, the vehicle 201 of FIG. 2A) to the second electronic device 203. The vehicle information may be stored in a memory of the first electronic device 101. The processor 120 may receive the vehicle information from a vehicle server (for example, the vehicle server 230 of FIG. 2A) through the communication module 190 according to a request of the first electronic device 101. The first electronic device 101 may make a request for transmitting vehicle information to the second electronic device 203 to the vehicle server 230.

In operation 1405, the processor 120 may generate a second digital key based on the vehicle information. The processor 120 may generate the second digital key on the basis of a certificate issued by a second electronic device server (for example, the second electronic device server 210 of FIG. 2A). According to various embodiments, the processor 120 may determine whether second mobile identity document information included in the vehicle information corresponds to second mobile identity document information stored in the memory and, when they are the same as each other, generate the second digital key on the basis of the vehicle information. The processor 120 may generate the second digital key on the basis of the vehicle information and the second mobile identity document information.

In operation 1407, the processor 120 may transmit the generated second digital key to the first electronic device 101. The processor 120 may transmit the second digital key according to a protocol encrypted with the first electronic device 101.

In operation 1409, the processor 120 may receive the second driver identification information or the signed second digital key. The second driver identification information may be generated by signing the second digital key by the first digital key of the first electronic device 101. The second driver identification information may include the second mobile identity document information (for example, a digest ID and a digest corresponding to a driver identification number) of the second electronic device 203 or may correspond to second mobile identity document information. The first electronic device 101 may sign the second digital key by the first digital key.

In operation 1411, the processor 120 may store the signed second digital key and the second driver identification information. The second electronic device 203 may store the signed second digital key and the second driver identification information in a private mailbox (for example, the second private mailbox 362 of FIG. 3C) of a second digital key applet (for example, the second digital key applet 380 of FIG. 3C).

According to various embodiments, the first electronic device 101 may transmit the signed second digital key or the second driver identification information to the vehicle 201. The signed second digital key or the second driver identification information may be transferred to the vehicle 201 through the vehicle server 230. The vehicle 201 may store the signed second digital key or the second driver identification information.

The processor 120 may make a request for controlling the vehicle 201 using the signed second digital key. When a request (or attempt) for controlling the vehicle 201 (for example, opening the door, starting the vehicle, or performing autonomous driving) is made by the second electronic device 203, the vehicle 201 may authenticate the signed second digital key. The vehicle 201 may authenticate the signed second digital key identically or similarly to the authentication of the first digital key. Further, the vehicle 201 may authenticate the second mobile identity document of the second user of the second electronic device 203 by performing the operation of FIG. 4 and, when the second mobile identity document information is successfully authenticated, authenticate the second driver identification information. The vehicle 201 may read and authenticate the second driver identification information stored in the second private mailbox 382 of the second digital key applet 380 of the second electronic device 203.

The vehicle 201 may allow the control of the vehicle on the basis of the authentication of the information. The vehicle 201 may signature-verify the second driver identification information by the first digital key. When the second mobile identity document information and the second driver identification information are successfully authenticated, the vehicle 201 may allow the second electronic device 203 to control the vehicle. When the authentication of at least one of the second mobile identity document information and the second driver identification information fails, the vehicle 201 may not allow the second electronic device 203 to control the vehicle. When the authentication of the second driver identification information is not successfully completed, the right to control the vehicle 201 may be totally or partially limited. For example, when the authentication of the second driver identification information is not successfully completed, the vehicle 201 may allow door opening or starting the vehicle 201 and may not allow the autonomous driving mode.

A method of operating an electronic device (for example, the electronic device 101 of FIG. 1) according to various example embodiments of the disclosure may include: based on the electronic device being connected to a vehicle through a communication module (for example, the communication module 190 of FIG. 1), transmitting mobile identity document information stored in a memory of the electronic device to the vehicle, receiving vehicle information from the vehicle, generating a digital key of the vehicle based on the vehicle information or the mobile identity document information, transmitting the generated digital key to the vehicle, receiving a digital key signed by the vehicle and driver identification information from the vehicle, and storing the signed digital key and the driver identification information in the memory.

The generating may include: determining whether mobile identity document information included in the vehicle information corresponds to the mobile identity document information stored in the memory and based on the mobile identity document information included in the vehicle information corresponding to the mobile identity document information stored in the memory, generating the digital key of the vehicle, based on the vehicle information or the mobile identity document information.

The signed digital key may be signed by a private key of the vehicle, and the driver identification information may include the mobile identity document information and may be signed by the private key of the vehicle, the method further including making a request for controlling the vehicle based on the digital key stored in the memory, based on the digital key and mobile identity document information corresponding to the electronic device being authenticated by the vehicle, transmitting the driver identification information stored in the memory to the vehicle, and acquiring the control of the vehicle, based on whether the driver identification information is authenticated by the vehicle.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication module comprising communication circuitry;
memory; and
at least one processor including processing circuitry,
wherein the memory stores instructions which, when executed by the at least one processor, cause the electronic device to:
based on the electronic device being connected to a vehicle, transmit mobile identity document information stored in the memory to the vehicle through the communication module,
receive vehicle information from the vehicle, the vehicle information including mobile identity document information,
based on determining that the mobile identity document information included in the vehicle information corresponds to the mobile identity document information stored in the memory, generate a digital key for controlling one or more functions of the vehicle,
transmit the generated digital key to the vehicle,
receive, from the vehicle, a digital key signed by the vehicle based on a private key of the vehicle and driver identification information which is generated by signing the mobile identity document information by the private key of the vehicle,
store the signed digital key and the driver identification information in the memory,
make a request for controlling the vehicle based on the signed digital key stored in the memory,
based on the signed digital key and the mobile identity document information corresponding to the electronic device being authenticated by the vehicle, transmit the driver identification information stored in the memory to the vehicle,
based on the driver identification information being authenticated by the vehicle,
control the vehicle, and
based on the driver identification information not being authenticated by the vehicle, limit at least some functions of the vehicle,
wherein the mobile identity document information comprises mobile identity document signature information and mobile security object (MSO) information including a value obtained by hashing a value included in the mobile identity document signature information.

2. The electronic device of claim 1, wherein instructions, when executed by at least one processor comprising processing circuitry, cause the electronic device to:
authenticate mobile identity document information included in the digital key by the vehicle, and
based on the mobile identity document information included in the digital key being authenticated, receive the signed digital key and the signed driver identification information from the vehicle.

3. The electronic device of claim 1, wherein instructions, when executed by at least one processor comprising processing circuitry, cause the electronic device to:

based on a vehicle sharing request being received from a second electronic device, authenticate second mobile identity document information of the second electronic device, based on the second mobile identity document information being authenticated, transmit vehicle information of the vehicle to the second electronic device, receive a second digital key from the second electronic device, and generate second driver identification information corresponding to the second electronic device.

4. The electronic device of claim 3, wherein instructions, when executed by at least one processor comprising processing circuitry, cause the electronic device to generate the second driver identification information by signing the second digital key using the signed digital key.

5. The electronic device of claim 4, wherein instructions, when executed by at least one processor comprising processing circuitry, cause the electronic device to:

bind the signed second digital key with the second driver identification information and store the bound signed second digital key and second driver identification information in the memory.

6. An electronic device included in a vehicle, the electronic device comprising:

a communication module comprising communication circuitry;

memory; and at least one processor including processing circuitry, wherein the memory stores instructions which, when executed by the at least one processor, cause the electronic device to:

based on the electronic device being connected to a first external device, receive first mobile identity document information from the first external device through the communication module, authenticate the first mobile identity document information, based on the first mobile identity document information being authenticated, insert the first mobile identity document information into vehicle information stored in the memory, transmit the vehicle information including the first mobile identity document information to the first external device, receive a first digital key from the first external device, determine whether mobile identity document information included in the first digital key corresponds to the first mobile identity document information included in the vehicle information, based on the mobile identity document information included in the first digital key corresponding to the first mobile identity document information included in the vehicle information, sign the first digital key by the vehicle based on a private key of the vehicle, generate first driver identification information corresponding to the first mobile identity document information by the private key of the vehicle, transmit the signed first digital key and the first driver identification information to the first external device, receive a request for controlling the vehicle based on the signed first digital key and the first driver identification information, based on authenticating the first driver identification information, control the vehicle, and based on not authenticating the first driver identification information, limit at least some functions of the vehicle wherein the first mobile identity document information comprises mobile identity document signature information and mobile security object (MSO) information including a value obtained by hashing a value included in the mobile identity document signature information.

7. The electronic device of claim 6, wherein instructions, when executed by at least one processor comprising processing circuitry, cause the electronic device to:

receive a second digital key or second driver identification information from the first external device and store the second digital key and the second driver identification information, based on a request for controlling the vehicle being made by a second external device, authenticate the second digital key stored in the second external device, authenticate second mobile identity document information corresponding to the second external device based on the authentication of the second digital key, and based on the second mobile identity document information being authenticated, read and authenticate second driver identification information stored in the second external device.

8. The electronic device of claim 7, wherein instructions, when executed by at least one processor comprising processing circuitry, cause the electronic device to:

allow the control of the vehicle based on the second driver identification information being authenticated, and limit at least some functions of the vehicle based on the second driver identification information not being authenticated.

9. A method of operating an electronic device, the method comprising:

based on the electronic device being connected to a vehicle through a communication module, transmitting mobile identity document information stored in a memory of the electronic device to the vehicle;

receiving vehicle information from the vehicle, the vehicle information including mobile identity document information;

based on determining that the mobile identity document information included in the vehicle information corresponds to the mobile identity document information stored in the memory, generating a digital key for controlling one or more functions of the vehicle;

transmitting the generated digital key to the vehicle;

receiving, from the vehicle, a digital key signed by the vehicle based on a private key of the vehicle and driver identification information which is generated by signing the mobile identity document information by the private key of the vehicle;

storing the signed digital key and the driver identification information in the memory;

making a request for controlling the vehicle, based on the signed digital key stored in the memory;

based on the signed digital key and the mobile identity document information corresponding to the electronic device being authenticated by the vehicle, transmitting the driver identification information stored in the memory to the vehicle;

based on the driver identification information being authenticated by the vehicle, acquiring control of the vehicle; and based on the driver identification information not being authenticated by the vehicle, limiting at least some functions of the vehicle, wherein the mobile identity document information comprises mobile identity document signature information and mobile security object (MSO) information including a value obtained by hashing a value included in the mobile identity document signature information.

* * * * *